(12) United States Patent
Li et al.

(10) Patent No.: US 12,550,012 B2
(45) Date of Patent: Feb. 10, 2026

(54) NON TERRESTRIAL NETWORK NTN HANDOVER METHOD, DEVICE AND STORAGE MEDIUM

(71) Applicant: GUANGDONG OPPO MOBILE TELECOMMUNICATIONS CORP., LTD., Guangdong (CN)

(72) Inventors: Haitao Li, Guangdong (CN); Xin You, Guangdong (CN); Zhe Fu, Guangdong (CN); Shukun Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 360 days.

(21) Appl. No.: 17/881,108

(22) Filed: Aug. 4, 2022

(65) Prior Publication Data

US 2022/0377625 A1 Nov. 24, 2022

Related U.S. Application Data

(63) Continuation of application No. PCT/CN2020/074775, filed on Feb. 11, 2020.

(51) Int. Cl.
*H04W 36/08* (2009.01)
*H04W 36/00* (2009.01)
(Continued)

(52) U.S. Cl.
CPC ........ *H04W 36/0058* (2018.08); *H04W 36/08* (2013.01); *H04W 36/322* (2023.05); *H04W 36/362* (2023.05); *H04W 84/06* (2013.01)

(58) Field of Classification Search
CPC ........... H04W 36/0058; H04W 36/322; H04W 36/362; H04W 36/08; H04W 84/06
See application file for complete search history.

(56) References Cited

U.S. PATENT DOCUMENTS

2002/0094820 A1* 7/2002 Keranen ................... G01S 5/14
 342/450
2020/0267681 A1* 8/2020 Ferrari .................. H04W 64/00
(Continued)

FOREIGN PATENT DOCUMENTS

CN 1164950 A 11/1997
CN 1332945 A 1/2002
(Continued)

OTHER PUBLICATIONS

International Search Report (ISR) dated Nov. 12, 2020 for Application No. PCT/CN2020/074775.
(Continued)

*Primary Examiner* — Chandrahas B Patel
*Assistant Examiner* — Andrew Shaji Kurian
(74) *Attorney, Agent, or Firm* — Ladas & Parry LLP

(57) ABSTRACT

Embodiments of the present application provide a non terrestrial communication network NTN handover method, a device, and a storage medium; and the method includes: a terminal device measuring channel measurement parameters and location measurement parameters of a current serving cell and at least one first adjacent cell; the terminal device sending the measurement results of the current serving cell and at least one second adjacent cell to a network device; where the second adjacent cell is an adjacent cell which satisfies a measurement reporting condition; where the measurement results are configured to instruct the network device to determine a target cell to be handed over for the terminal device; and the terminal device performs handover according to a handover command received, where the handover command is configured to instruct the terminal device to perform handover from the current serving cell to the target cell.

15 Claims, 9 Drawing Sheets

(51) Int. Cl.
  *H04W 36/32* (2009.01)
  *H04W 36/36* (2009.01)
  *H04W 84/06* (2009.01)

(56) References Cited

U.S. PATENT DOCUMENTS

| | | | |
|---|---|---|---|
| 2020/0314892 A1* | 10/2020 | Wang | H04W 74/006 |
| 2021/0099942 A1* | 4/2021 | Tripathi | H04W 36/0058 |
| 2021/0242935 A1* | 8/2021 | Sakhnini | H04B 7/18543 |
| 2021/0251012 A1* | 8/2021 | Shrestha | H04W 72/23 |
| 2021/0377828 A1* | 12/2021 | Tao | H04W 36/0058 |
| 2022/0132356 A1* | 4/2022 | Jung | H04W 24/10 |
| 2022/0256415 A1* | 8/2022 | Höhne | H04L 12/413 |
| 2022/0386197 A1* | 12/2022 | Hwang | H04W 36/362 |
| 2024/0235775 A1* | 7/2024 | Wang | H04B 7/0404 |
| 2024/0323787 A1* | 9/2024 | Ma | H04W 36/14 |
| 2024/0396681 A1* | 11/2024 | Zorgui | G01S 5/0027 |
| 2025/0062864 A1* | 2/2025 | Wang | H04L 5/0055 |

FOREIGN PATENT DOCUMENTS

| | | | | |
|---|---|---|---|---|
| CN | 1369712 A | | 9/2002 | |
| CN | 102892163 A | | 1/2013 | |
| CN | 104185233 A | | 12/2014 | |
| CN | 104219718 A | | 12/2014 | |
| CN | 104735738 A | | 6/2015 | |
| CN | 108112281 A | | 6/2018 | |
| CN | 108337700 A | | 7/2018 | |
| CN | 104854932 B | * | 11/2019 | G01S 5/0018 |
| CN | 111148266 A | * | 5/2020 | H04W 72/042 |
| CN | 112566190 A | * | 3/2021 | H04W 36/00835 |
| WO | 9313618 A1 | | 7/1993 | |
| WO | WO-2020153884 A1 | * | 7/2020 | |
| WO | WO-2021062729 A1 | * | 4/2021 | |

OTHER PUBLICATIONS

Written Opinion (WOSA) dated Nov. 12, 2020 for Application No. PCT/CN2020/074775.
3GPP 3GPP TR 38.811 V15.2.0 (Sep. 2019) Study on New Radio (NR) to support non-terrestrial networks (Release 15) Sep. 30, 2020 (Sep. 30, 2020).
The EESR of corresponding European application No. 20918720.2. dated Jan. 4, 2023.
Interdigital, TP on NTN Mobility issues and solutions, R2-1914194 Revision of R2-1913605, 3GPP RAN WG2 Meeting #107bis, Chongqing, China, Oct. 14-Oct. 18, 2019.
InterDigital Inc. (Email discussion rapporteur), Report of Email Discussion [107#62][NR/NTN] TP Mobility, R2-1913604, 3GPP RAN WG2 Meeting #107bis. Chongqing, China, Oct. 14-Oct. 18, 2019.
The first Office Action of corresponding European application No. 20918720.2, dated Mar. 17, 2025.

* cited by examiner

NON TERRESTRIAL NETWORK NTN HANDOVER METHOD, DEVICE AND STORAGE MEDIUM

CROSS-REFERENCE TO RELATED APPLICATIONS

This application is a continuation of International Application No. PCT/CN2020/074775, filed on Feb. 11, 2020, which is hereby incorporated by reference in its entirely.

TECHNICAL FIELD

Embodiments of the present application relate to the field of communication technologies and, in particular, to a non terrestrial network NTN handover method, a device and a storage medium.

BACKGROUND

Satellite communication is generally used in the non terrestrial network (NTN) technology to provide a communication service to terrestrial users. Compared with terrestrial cellular network communication, the satellite communication has multiple unique advantages. Firstly, the satellite communication is not limited by a geographical area of a user, for example, general terrestrial communication cannot cover an area (such as, the ocean, a mountain, a desert) where a communication device cannot be erected or an area that is not covered by communication due to small population, however, for the satellite communication, every corner of the Earth can be covered by the satellite communication theoretically since a single satellite can cover a large ground and the satellite can orbit around the Earth. Secondly, the satellite communication has great social value. Remote mountainous areas and poor and backward countries or regions can be covered by the satellite communication at low cost, so that people in these areas can enjoy advanced voice communication and mobile Internet technology, which is conducive to narrowing a digital divide with developed areas and promoting development in these areas. Thirdly, a communication distance of the satellite is long, and a communication cost does not increase significantly when the communication distance increases; finally, the satellite communication has high stability and is not limited by a natural disaster.

In a New Radio (NR) system, as shown in FIG. 1, a reference signal received power (RSRP) of a terminal when the terminal is at a center of a cell is significantly higher than an RSRP when the terminal is at an edge of the cell. Due to an obvious "near-far effect", when the terminal moves to the edge of the cell, a signal quality of the serving cell becomes worse, and a signal quality of an adjacent cell becomes better. Therefore, a mobility management may be performed based on a signal quality measurement of the cell by the terminal, for example, the terminal may judge whether it has moved to the edge of the cell through a result of the RSRP measurement, so as to prepare for handover.

During an implementation process of the present application, the inventor found that: in an NTN system as shown in FIG. 2, a difference between RSRPs corresponding to a terminal at the center of the cell and a terminal at the edge of the cell is not obvious. If a handover mechanism based on an RSRP measurement in the NR system is used, it is difficult for a terminal to identify whether the terminal is at the edge of the cell through a result of the RSRP measurement, and it is also difficult to find an adjacent cell with a better channel quality than the current serving cell through the result of the RSRP measurement. Therefore, a situation may occur that the terminal has left an original serving cell and entered into another cell, but fails to handover to the new cell in time, thus leading to interruption of a service of the terminal and affecting the user experience.

SUMMARY

Embodiments of the present application provide a non terrestrial communication network NTN handover method, a device, and a storage medium, so as to realize a timely handover to a target cell during a moving process of a terminal, thereby ensuring service continuity of the terminal device.

In a first aspect, an embodiment of the present application may provide an NTN handover method, including:
  measuring, by a terminal device, channel measurement parameters and location measurement parameters of a current serving cell and at least one first adjacent cell;
  sending, by the terminal device, measurement results of the current serving cell and at least one second adjacent cell to a network device; where the second adjacent cell is an adjacent cell which satisfies a first measurement reporting condition in the at least one first adjacent cell; where the measurement results are configured to instruct the network device to determine a target cell to be handed over for the terminal device from the at least one second adjacent cell; and
  performing, by the terminal device, handover according to a handover command received, where the handover command is configured to instruct the terminal device to perform handover from the current serving cell to the target cell.

In a second aspect, an embodiment of the present application may provide an NTN handover method, including:
  measuring, by a terminal device, channel measurement parameters and location measurement parameters of a current serving cell and at least one first adjacent cell according to a conditional handover command received, where the conditional handover command is configured to trigger the terminal device to measure based on the channel measurement parameters and the location measurement parameters;
  determining, by the terminal device, a target cell which satisfies a handover condition according to measurement results of the channel measurement parameters and the location measurement parameters of the current serving cell and the at least one first adjacent cell; and
  performing, by the terminal device, handover from the current serving cell to the target cell In a third aspect, an embodiment of the present application may provide an NTN handover method, including:
  receiving, by a network device, measurement results of a current serving cell and at least one second adjacent cell, where the at least one second adjacent cell is an adjacent cell which satisfies a first measurement reporting condition in the at least one first adjacent cell;
  determining, by the network device, a target cell according to the measurement results of the current serving cell and the at least one second adjacent cell; and
  sending, by the network device, a handover command, where the handover command is configured to instruct a terminal device to perform handover from the current serving cell to the target cell.

In a fourth aspect, an embodiment of the present application may further provide a terminal device, including:

a measuring module, configured to measure channel measurement parameters and location measurement parameters of a current serving cell and at least one first adjacent cell;

a sending module, configured to measurement results of the current serving cell and at least one second adjacent cell to a network device; where the second adjacent cell is an adjacent cell which satisfies a first measurement reporting condition in the at least one first adjacent cell; where the measurement results are configured to instruct the network device to determine a target cell to be handed over for the terminal device from the at least one second adjacent cell; and a processing module, configured to perform handover according to a handover command received, where the handover command is configured to instruct the terminal device to perform handover from the current serving cell to the target cell.

In a fifth aspect, an embodiment of the present application may further provide a terminal device, including:

a measuring module, configured to measure channel measurement parameters and location measurement parameters of a current serving cell and at least one first adjacent cell according to a conditional handover command received; where the conditional handover command is configured to trigger the terminal device to measure based on the channel measurement parameters and the location measurement parameters; and a processing module, configured to determine a target cell which satisfies a handover condition according to measurement results of the channel measurement parameters and the location measurement parameters of the current serving cell and the at least one first adjacent cell;

where the processing module is further configured to perform handover from the current serving cell to the target cell.

In a sixth aspect, an embodiment of the present application may further provide a network device, including:

a receiving module, configured to receive measurement results of a current serving cell and at least one second adjacent cell, where the at least one second adjacent cell is an adjacent cell which satisfies a first measurement reporting condition in the at least one first adjacent cell;

a processing module, configured to determine a target cell according to the measurement results of the current serving cell and the at least one second adjacent cell; and a sending module, configured to send a handover command, where the handover command is configured to instruct a terminal device to perform handover from the current serving cell to the target cell.

In a seventh aspect, an embodiment of the present application may further provide a terminal device, including:

a processor, a memory, and an interface for communicating with a network device; where the memory stores computer-executable instructions;

the processor executes the computer-executable instructions stored in the memory to cause the processor to execute the handover method provided in the first or the second aspect.

In an eighth aspect, an embodiment of the present application may further provide a network device, including:

a processor, a memory, and an interface for communicating with a terminal device; where the memory stores computer-executable instructions; and the processor executes the computer-executable instructions stored in the memory to cause the processor to execute the handover method provided in the third aspect.

In a ninth aspect, an embodiment of the present application provides a computer-readable storage medium, where the computer-readable storage medium stores computer-executable instructions, and the computer-executable instructions, when executed by a processor, are used to implement the handover method according to the first and or second aspect.

In a tenth aspect, an embodiment of the present application provides a computer-readable storage medium, where the computer-readable storage medium stores computer-executable instructions, and the computer-executable instructions, when executed by a processor, are used to implement the handover method according to the third aspect.

In an eleventh aspect, an embodiment of the present application provides a program, where the program, when executed by a processor, is used to execute the handover method according to the first or the second aspect.

In a twelfth aspect, an embodiment of the present application provides a program, where the program, when executed by a processor, is used to execute the handover method according to the third aspect.

In an implementation, the above processor may be a chip.

In an thirteenth aspect, an embodiment of the present application provides a computer program product including program instructions, where the program instructions are used to implement the handover method according to the first or the second aspect.

In a fourteenth aspect, an embodiment of the present application provides a computer program product including program instructions, where the program instructions are used to implement the handover method according to the third aspect.

In a fifteenth aspect, an embodiment of the present application provides a chip, including a processing module and a communication interface, where the processing module can execute the handover method according to the first or the second aspect.

Furthermore, the chip further includes a storage module (such as a memory), the storage module is configured to store instructions, the processing module is configured to execute the instructions stored in the storage module, and the execution of the instructions stored in the storage module causes the processing module to execute the handover method according to the first or the second aspect.

In a sixteenth aspect, an embodiment of the present application provides a chip, including a processing module and a communication interface, where the processing module can execute the handover method according to the third aspect.

Furthermore, the chip further includes a storage module (such as a memory), the storage module is configured to store instructions, the processing module is configured to execute the instructions stored in the storage module, and the execution of the instructions stored in the storage module causes the processing module to execute the handover method according to the third aspect.

In the non terrestrial network NTN handover method, the device, and the storage medium provided in the embodiments of the present application, for an NTN system, measurement results of channel measurement parameters and location measurement parameters of the terminal device are considered simultaneously when the terminal device performs handover, it is possible to know that the terminal device is moving to a target cell in time since the measurement results of the location measurement parameters are considered, thus ensuring the terminal device to perform handover to the target cell in time during the moving process, and avoiding a situation that the terminal device has moved to the target cell but has not yet triggered handover, thereby effectively ensuring a service continuity of the terminal device of a user during the moving process, improving handover robustness, consequently enabling the user to obtain a better experience.

BRIEF DESCRIPTION OF THE DRAWINGS

In order to more clearly describe the technical solution in embodiments of the present application or the prior art, in the following, the drawings that need to be used in the description of the embodiments or the prior art will be briefly introduced. Apparently, the drawings in the following description are a part of embodiments of the present application. For the persons of ordinary skill in the art, other drawings can be obtained based on these drawings without paying creative labor.

DESCRIPTION OF EMBODIMENTS

In order to make the purpose, the technical solution, and the advantage of embodiments of the present application clearer, the technical solution in embodiments of the present application will be clearly and completely described below with reference to the accompanying drawings. Apparently, the described embodiments are merely a part rather than all embodiments of the present application. All other embodiments obtained by persons of ordinary skill in the art based on embodiments in the present application without paying creative labor shall fall within the protection scope of the present application.

The terms "first", "second", etc. in the description, claims, and the aforementioned drawings of the embodiments of the present application are used to distinguish similar objects, and are not used to describe a specific order or sequence. It should be understood that data used in this way can be interchanged under appropriate circumstances, so that the embodiments of the present application described herein may be implemented, for example, in a sequence other than those illustrated or described herein. In addition, the terms "including" and "having" and any variations of them are intended to cover non-exclusive inclusions. For example, a process, method, system, product, or device that includes a series of steps or units is not necessarily limited to those clearly listed steps or units, but may include other steps or units that are not clearly listed or are inherent to these process, method, product, or device.

First, application scenarios involved in embodiments of the present application are introduced.

Communication satellites in non terrestrial communication networks are classified into a low-earth orbit (LEO) satellite, a medium-earth orbit (MEO) satellite, a geostationary earth orbit (GEO) satellite, a high elliptical orbit (HEO) satellite and the like according to orbital heights. At present, a main research is on the LEO and the GEO.

For the LEO, an altitude range of a satellite is 500 km-1500 km, and a corresponding orbital period is about 1.5 hours-2 hours. A signal propagation delay of single-hop communication between users is generally less than 20 ms. A maximum time of visibility of the satellite is 20 minutes. A signal propagation distance is short, and a link loss is small, thus a transmit power requirement for a user terminal are not high.

For the GEO, an orbital altitude is 35,786 km, and a rotation period around the Earth is 24 hours. A signal propagation delay of single-hop communication between users is generally 250 ms.

In order to ensure a coverage of a satellite and improve a system capacity of an entire satellite communication system, the satellite adopts multiple beams to cover the ground. One satellite may form dozens or even hundreds of beams to cover the ground; one satellite beam may cover a ground area with a diameter of tens to hundreds of kilometers.

Figure 1:
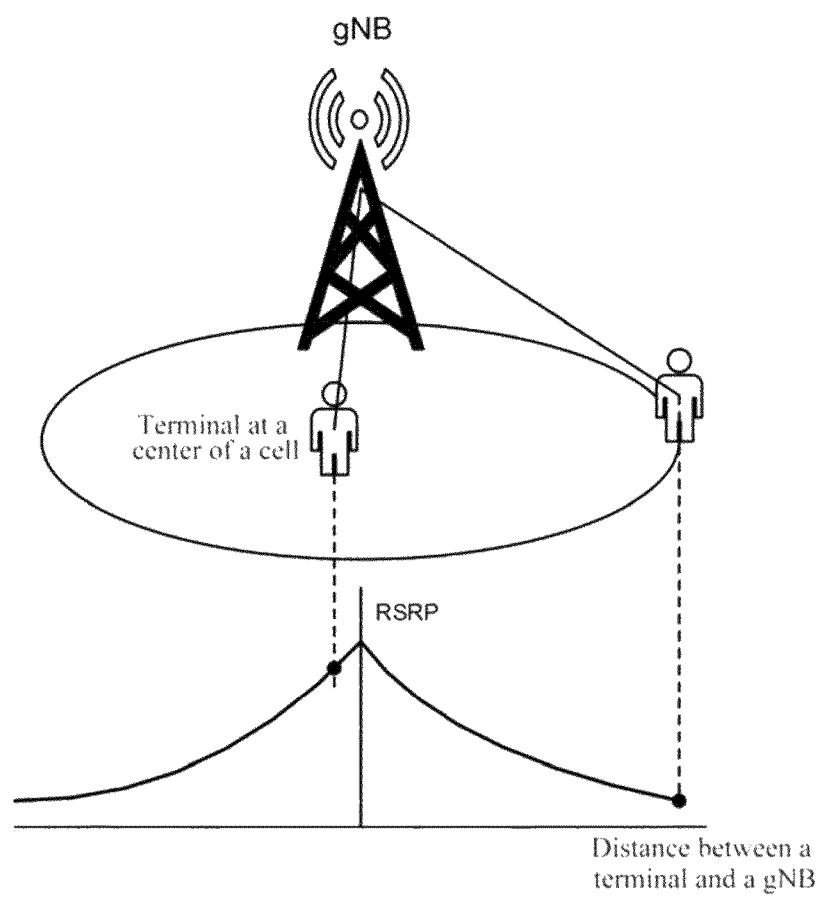
FIG. 1 is a schematic diagram of a handover principle of an NR system provided by the present application.
Figure 2:
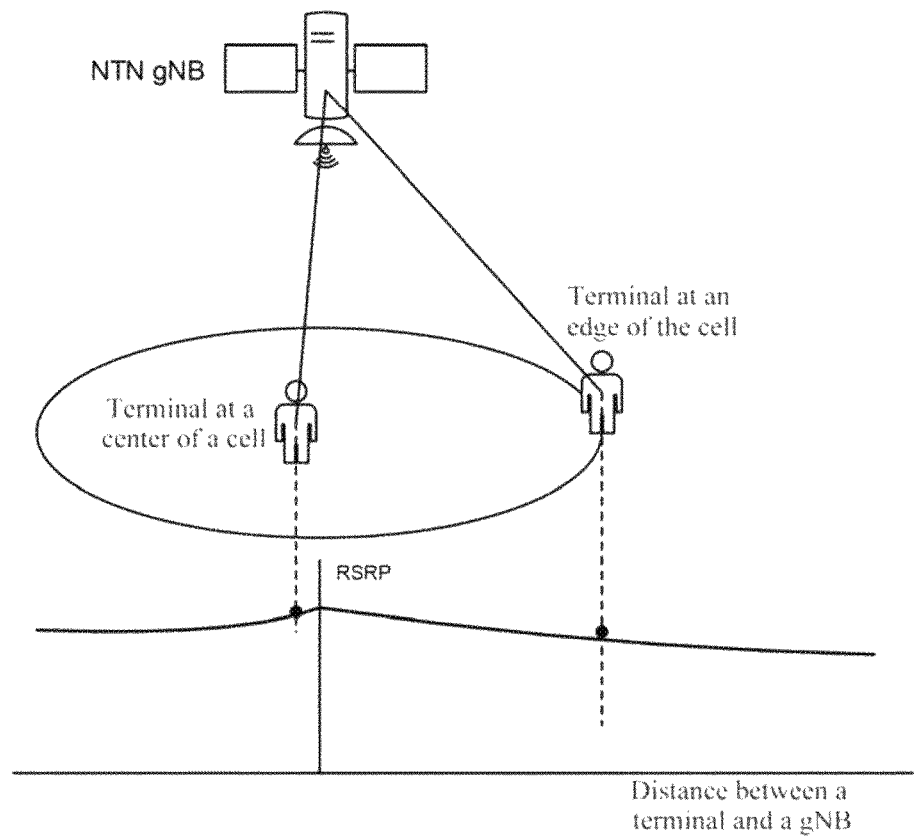
FIG. 2 is a schematic diagram of a handover principle of an NTN system provided by the present application.
Figure 3:
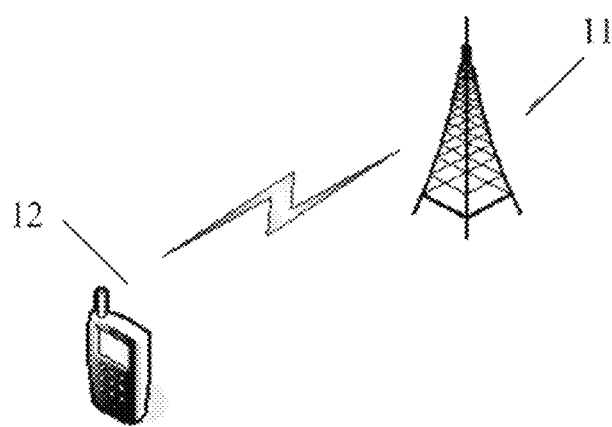
FIG. 3 is a schematic diagram of a communication system to which an embodiment of the application is applied.

FIG. 3 is a schematic diagram of a communication system to which an embodiment of the application is applied. As shown in FIG. 3, the communication system includes at least a network device 11 and a terminal device 12. It may be understood that, in an actual communication system, there may be one or more network devices 11 and terminal devices 12. In FIG. 3, one network device is taken as an example, and one terminal device 12 is taken as an example.

In FIG. 3, the network device 11 may be an access network device, for example, may be an access device in an LTE network and its evolved network, such as an evolutional Node B (eNB or eNodeB), or may also include a next generation node B (gNB) in a 5G NR system, or may also include an access network device in an NTN system, or a relay station, or a base station in a new network system in the future.

The terminal device 12 may also be referred to as a mobile terminal, user equipment (UE), an access terminal, a user unit, a user station, a mobile station, a mobile platform, a user terminal, a terminal, a wireless communication device, a user agent or a user apparatus. Specifically, it may be a smart phone, a cellular phone, a cordless phone, a personal digital processing (PDA) device, a handheld device with wireless communication function or another processing device connected to a wireless modem, a vehicle-mounted device, a wearable, etc. In embodiments of the present application, the terminal device has an interface for communicating with a network device.

In the NR system, handover is generally performed based on a result of a mobility measurement of a terminal, which mainly refers to the mobility measurement in a connected state. For a normal handover scenario, after a network delivers a measurement configuration to the terminal, the terminal detects signal quality status of an adjacent cell according to parameters, such as, a measurement object, a reporting configuration and the like indicated in the measurement configuration, and feeds back measurement report information to the network for the network to perform a handover related operation or complete an adjacent cell relationship list.

1. Explanation for Measurement Configuration

In an NR system, a network may send measurement configuration information to a terminal in a connected state via configuration signaling (such as RRC signaling); the terminal performs measurement (intra-frequency, inter-frequency, inter-RAT (frequency measurement of different communication systems)) according to content of the measurement configuration information, and then reports a measurement result to the network side. For example, the network side may perform measurement configuration via RRC connection reconfiguration signaling, where the measurement configuration information includes the following content.

1. Measurement Object

For intra-frequency measurement (same frequency as the current serving cell) and inter-frequency measurement, each measurement object indicates a time-frequency location of a carrier frequency to be measured. For a cell related to the measurement object, the network may configure a cell offset (Offset) list (a list of cells with a specific frequency offset from the carrier frequency of the measurement object), a list of blacklisted cells and a list of whitelisted cells.

For inter-RAT measurement, each measurement object corresponds to a separate evolved universal terrestrial radio access network (E-UTRA) frequency point, and for a cell related to the E-UTRA frequency point, the network may configure a cell offset list, a list of blacklisted cells and a list of whitelisted cells.

The terminal does not perform any operation on the blacklisted cells in event evaluation and measurement report. The terminal performs event evaluation and measurement report on the whitelisted cells.

2. Reporting Configuration

Each measurement object corresponds to one or more reporting configurations. The reporting configuration includes:
  a reporting criterion: that is, a triggering condition for the terminal to perform measurement reporting, which may be periodic trigger reporting or event trigger reporting;
  a reference signal (RS) type: an RS used for measurement by the terminal, which may be a synchronization signal/physical broadcast channel (SS/PBCH) block or a channel state information reference signal (CSI-RS);
  a reporting format: a measurement reporting amount (such as RSRP) of the terminal for each cell and each beam, and other related information may be included, such as a maximum number of cells reported by the terminal and a maximum number of beams reported for each cell.

3. Measurement Identity

Each measurement identity associates the measurement object with the reporting configuration. One measurement object may be associated with multiple reporting configurations at the same time, while one reporting configuration may also be associated with multiple measurement objects which are distinguished by measurement identities at the same time.

II. Explanation for Measurement Reporting

The terminal performs measurement according to the measurement configuration delivered by the network, and evaluates measurement reporting when a certain trigger condition is satisfied. If a reporting condition is satisfied, the terminal sends a measurement report which includes a measurement result to the network.

There are three types of triggers for measurement reporting:
  event triggering: the terminal will trigger sending of the measurement report only upon a satisfaction that a measurement event configured by the network enters a threshold and lasts for a period of time, and the process ends after the measurement report is sent once;
  periodic reporting: the terminal measures a corresponding frequency point according to the measurement configuration information after the network's configuration, and sends the measurement report according to a specified reporting period and interval;
  event-triggered periodic reporting: the terminal will trigger sending of the measurement report only upon a satisfaction that a measurement event configured by the network enters a threshold and lasts for a period of time; and after the reporting is triggered, a timer between multiple measurements and a counter for times of measurements will be started until the number of times of reporting meets a requirement.

For conditional handover scenarios, for example, frequent handovers are required when a terminal moves at a high-speed or at a high-frequency. In order to avoid a problem that the terminal performs handover too late due to too long handover preparation time, the network configures a handover command (HO command) for the terminal in advance. For example, for a high-speed rail scenario, a running track of the terminal is specific, so the network side can allocate candidate target cells to the terminal in advance, and include a condition for triggering the terminal to perform handover in the HO command; the terminal initiates an access request to the base station of the target cell when the configured condition is met. In this scenario, handover judgment is performed by the terminal, where the measurement reporting is not required.

The relevant provisions on measurement configuration, reporting, etc. in the above NR system are also applicable to the NTN system.

If a handover is performed based on the signal quality measurement (RSRP measurement or RSRQ measurement) mechanism in the NTN system, it is difficult for a terminal to identify whether the terminal is at the edge of the cell through a result of the RSRP measurement, and it is also difficult to find an adjacent cell with a better channel quality than the current serving cell through the result of the RSRP measurement. Therefore, it may appear that the terminal has left an original serving cell and entered into another cell, but fails to handover to the new cell in time, which causes a service of the terminal to be interrupted and affects the user experience.

Therefore, the technical concept of the method in an embodiment of the present application is as follows: when performing handover, measurement results of channel measurement parameters and location measurement parameters of the terminal are considered at the same time, that is, the handover is performed according to respective measurement results based on channel measurement parameters and location measurement parameters of a current serving cell and at least one adjacent cell.

In an embodiment, the terminal device may perform measurement reporting according to respective measurement results of channel measurement and location measurement of the current serving cell and each cell in at least one adjacent cell, and the network device triggers handover according to the measurement results reported by the terminal device, for example, sends a handover request to a network device of a target cell; the network device of the target cell sends a handover confirmation message which includes a handover command to the network device of the current serving cell; the network device of the current serving cell sends the handover command to the terminal device, and the terminal device performs a handover operation, that is, the terminal device disconnects from the network device of the current serving cell and accesses the target cell.

In an embodiment, the terminal device may perform a handover operation according to respective measurement results based on channel measurement and location measurement of the current serving cell and at least one adjacent cell. For example, the terminal device disconnects from the network device of the current serving cell and accesses a target cell.

In embodiments of the present application, the channel measurement parameter and the location measurement parameter are only exemplary names, and other parameter names may also be used in other embodiments, which are not limited in the present application.

The technical solutions of the present application will be described in detail below with specific embodiments. The following specific embodiments may be combined with each other, and the same or similar concepts or processes may not be repeated in some embodiments.

Figure 4:
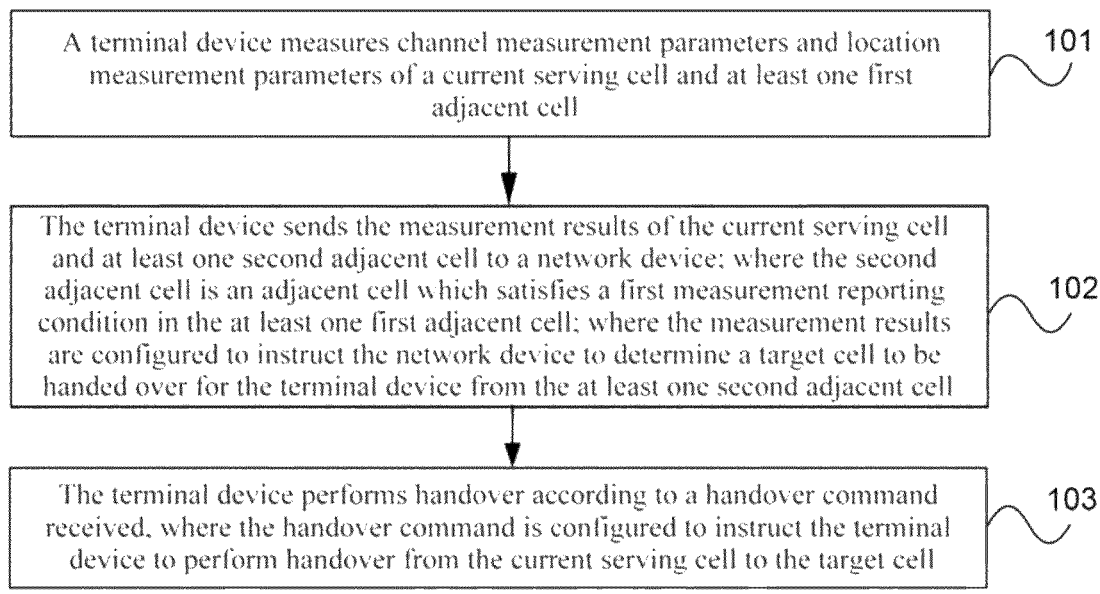
FIG. 4 is a flowchart of an embodiment of an NTN handover method provided by the present application.

FIG. 4 is a flowchart of an embodiment of an NTN handover method provided by the present application. As shown in FIG. 4, specific implementation steps of the embodiment include:

step 101: a terminal device measures channel measurement parameters and location measurement parameters of a current serving cell and at least one first adjacent cell.

In an embodiment, the terminal device receives measurement configuration information sent by the network device before measuring; for example, the measurement configuration information includes: measurement event information based on a channel measurement parameter and/or a location measurement parameter.

In an embodiment, the network device may send after the terminal device accesses the network device, or after the terminal device registers in the NTN network, which is not limited in the embodiment of the present application.

Among them, for the current serving cell and each cell in the at least one first adjacent cell, the measurement event is a measurement event based on a channel measurement parameter and/or a location measurement parameter. One or more measurement events may be configured for each cell, and parameters (such as a preset time period, a threshold or the like) corresponding to different measurement events may be different.

Among them, the network device may configure the terminal device with: measurement event information based on a channel measurement parameter, measurement event information based on a location measurement parameter, or measurement event information based on a channel measurement parameter and a location measurement parameter, where the above measurement event information may be carried in one or more pieces of measurement configuration information.

Among them, the first adjacent cell is a cell with the same carrier frequency as the current serving cell, or a cell with a different carrier frequency from the current serving cell. For each configured carrier frequency to be measured, the network may configure a cell offset list (a list of cells with a specific frequency offset from the carrier frequency), a list of blacklisted cells and a list of whitelisted cells.

In an embodiment, before step 101, the method further includes:

the terminal device receives a first measurement reporting condition corresponding to a measurement result of each first adjacent cell; where the first measurement reporting condition includes at least one of the following: a second measurement reporting condition based on channel measurement parameters, a third measurement reporting condition based on location measurement parameters, or a fourth measurement reporting condition based on channel measurement parameters and location measurement parameters.

Among them, the above measurement reporting conditions may be carried in the measurement configuration information.

Step 102: the terminal device sends the measurement results of the current serving cell and at least one second adjacent cell to a network device; where the second adjacent cell is an adjacent cell which satisfies the first measurement reporting condition in the at least one first adjacent cell; where the measurement results are configured to instruct the network device to determine a target cell to be handed over for the terminal device from the at least one second adjacent cell.

The terminal device measures the channel measurement parameters and location measurement parameters of the current serving cell and each first adjacent cell. The terminal device performs measurement reporting according to the measurement results of the channel measurement parameters and the measurement results of the location measurement parameters of the current serving cell and each cell of the first adjacent cell(s), and the network device triggers handover, that is, the network device selects a target network device of the target cell and sends a handover request.

In an embodiment, the terminal device may report the measurement results of second adjacent cells which satisfy the first measurement reporting condition and the measurement result of the current serving cell to the network device, and the network device selects the target cell to be handed over from these second adjacent cells which meet the measurement reporting condition.

The above measurement result includes at least one of the following: a measurement result based on a channel measurement parameter, a measurement result based on a location measurement parameter, and a measurement result based on a channel measurement parameter and a location measurement parameter.

If the network device receives a measurement result of the terminal device for one second adjacent cell, the network device determines that the second adjacent cell is the target cell, and the network device of the target cell is the target network device;

if the network device receives measurement results of the terminal device for multiple second adjacent cells, the network device selects one second adjacent cell from the reported second adjacent cells as the target cell, and the network device of the target cell is the target network device.

In an embodiment, the network device may select one adjacent cell from the multiple second adjacent cells as the target cell to be handed over, for example, select the second adjacent cell with a smallest measurement value based on measurement values of the location measurement parameters of the multiple second adjacent cells, or select the second adjacent cell whose measurement value of the location measurement parameter is the smallest and measurement value of the channel measurement parameter is the largest, etc., which is not limited in the present application.

Step 103: the terminal device performs handover according to a handover command received, where the handover command is configured to instruct the terminal device to perform handover from the current serving cell to the target cell.

The network device sends a handover request to the target network device. The target network device sends a handover confirmation message to the network device, where the handover confirmation message includes a handover command. The network device forwards the handover command from the target network device to the terminal device, and the terminal device performs handover after receiving the handover command.

In another embodiment, the measurement event information may also include the measurement reporting condition, which is not limited in the present application.

In an embodiment, the channel measurement parameter includes at least one of the following: a reference signal received power RSRP or a reference signal received quality RSRQ.

In an embodiment, the location measurement parameter includes at least one of the following: a round-trip transmission time RTT between the terminal device and the network device, or a distance between the terminal device and a ground reference point.

The method of the embodiment, for an NTN system, measurement results of channel measurement parameters and location measurement parameters of a terminal device are simultaneously considered when a target cell to be handed over is selected for the terminal device, it is possible to know that the terminal device is moving to a target cell in time since the measurement results of the location measurement parameters are considered, thus ensuring the terminal device to perform handover to the target cell in time during the moving process, and avoiding a situation that the terminal device has moved to the target cell but has not yet triggered handover, thereby effectively ensuring a service continuity of the terminal device of a user during the moving process, improving handover robustness, consequently enabling the user to obtain a better experience.

In an embodiment, the second adjacent cell is a first adjacent cell which satisfies the second measurement reporting condition, that is, the measurement result of the second adjacent cell includes the measurement result based on the channel measurement parameter.

The terminal device measures the channel measurement parameters of the current serving cell and each first adjacent cell. If there is at least one second adjacent cell which satisfies a triggering condition for measurement reporting, that is, the second measurement reporting condition, for example, within a period of time TTT1, measurement values of the channel measurement parameters of the second adjacent cell and the current serving cell satisfy a certain condition, the terminal device reports the measurement results based on the channel measurement parameters to the network device of the current serving cell. These measurement results may be reported via a measurement report.

In an embodiment, the second measurement reporting condition is: within a first preset time period, a measurement value of the channel measurement parameter of the first adjacent cell is greater than or equal to a first channel measurement threshold, and a measurement value of the channel measurement parameter of the current serving cell is less than or equal to a second channel measurement threshold; or, within a second preset time period, a difference between a measurement value of the channel measurement parameter of the first adjacent cell and a measurement value of the channel measurement parameter of the current serving cell is greater than or equal to a first relative threshold.

Among them, the first channel measurement threshold and the second channel measurement threshold may be the same or different.

Among them, the first preset time period and the second preset time period may be the same or different.

In an embodiment, the second adjacent cell is a first adjacent cell which satisfies the third measurement reporting condition, that is, the measurement result of the second adjacent cell includes the measurement result based on the location measurement parameter.

The terminal device measures the location measurement parameters of the current serving cell and each first adjacent cell. If there is at least one second adjacent cell which satisfies a triggering condition for measurement reporting, that is, the third measurement reporting condition, for example, within a period of time TTT2, measurement values of the location measurement parameters of the second adjacent cell and the current serving cell satisfy a certain condition, the terminal device reports the measurement results based on the location measurement parameters to the network device of the current serving cell. These measurement results may be reported via a measurement report.

In an embodiment, the third measurement reporting condition is: within a third preset time period, a measurement value of the location measurement parameter of the first adjacent cell is less than or equal to a first location measurement threshold, and a measurement value of the location measurement parameter of the current serving cell is greater than or equal to a second location measurement threshold, or, within a fourth preset time period, a difference between a measurement value of the location measurement parameter of the current serving cell and a measurement value of the location measurement parameter of the first adjacent cell is greater than or equal to a second relative threshold.

For example, within the third preset time period, an RTT of signal transmission between the terminal device and the network device of the first adjacent cell is less than or equal to the first location measurement threshold, and an RTT of signal transmission between the terminal device and the network device of the current serving cell is greater than or equal to the second location measurement threshold; or, within the third preset time period, a distance between the terminal device and the ground reference point of the first adjacent cell is less than or equal to the first location measurement threshold, and a distance between the terminal device and the ground reference point of the current serving cell is greater than or equal to the second location measurement threshold.

For example, within the fourth preset time period, a difference between an RTT of signal transmission between the terminal device and the network device of the current serving cell and an RTT of signal transmission between the terminal device and the network device of the first adjacent cell is greater than or equal to the second relative threshold; or, within the fourth preset time period, a difference between a distance between the terminal device and the ground reference point of the current serving cell and a distance between the terminal device and the ground reference point of the first adjacent cell is greater than or equal to the second relative threshold.

Among them, the first location measurement threshold and the second location measurement threshold may be the same or different.

Among them, the third preset time period and the fourth preset time period may be the same or different.

Among them, the first relative threshold and the second relative threshold may be the same or different.

Figure 5:
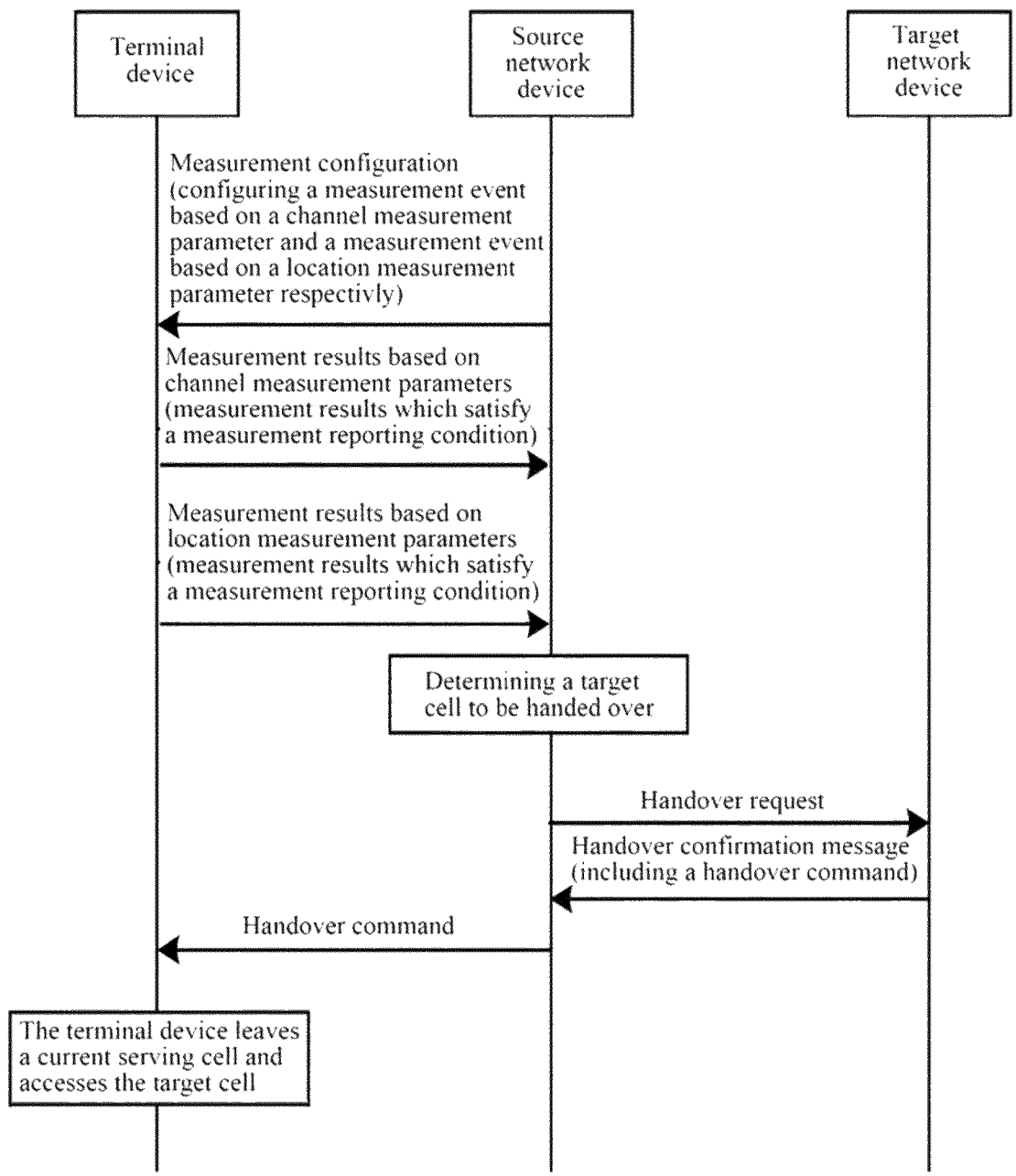
FIG. 5 is an interactive flowchart of an embodiment of an NTN handover method provided by the present application.

In an embodiment, as shown in FIG. 5, the network device (i.e., a source network device) of the current serving cell of the terminal device determines the target network device to be handed over for the terminal device according to the measurement results based on the channel measurement parameters and the measurement results based on the location measurement parameters from the terminal device, that is, screens the target cell to be handed over from the second adjacent cell(s).

If the source network device receives the measurement result based on the location measurement parameter and the measurement result based on the channel measurement parameter of the terminal device for one second adjacent cell, the source network device determines that the second adjacent cell is the target cell, and the network device of the target cell is the target network device;

if the source network device receives the measurement results based on the location measurement parameters and the measurement results based on the channel measurement parameters of the terminal device for multiple second adjacent cells, the source network device selects one second adjacent cell from the reported second adjacent cells as the target cell, and the network device of the target cell is the target network device.

Among them, the multiple second adjacent cells include: a third adjacent cell measured based on the channel measurement parameter and a fourth adjacent cell measured based on the location measurement parameter, and a common adjacent cell in the third adjacent cell and the fourth adjacent cell is selected as the target cell.

In an embodiment, if the measurement result of the current serving cell includes a measurement result based on a channel measurement parameter and a location measurement parameter, the measurement result of the at least one second adjacent cell includes a measurement result based on a channel measurement parameter of at least one third adjacent cell and a measurement result based on a location measurement parameter of at least one fourth adjacent cell, where the second adjacent cell includes the third adjacent cell and the fourth adjacent cell, where the third adjacent cell and the fourth adjacent cell may be the same cell or different cells (if they are different cells, the number of second adjacent cell is multiple), the network device may select the target cell according to the following manner, and perform a handover operation: the determining the target cell according to the measurement results of the current serving cell and the at least one second adjacent cell includes:

if there exists at least one same adjacent cell in the at least one third adjacent cell and the at least one fourth adjacent cell, and there is one same adjacent cell, the network device taking the same adjacent cell as the target cell;

if there exists at least one same adjacent cell in the at least one third adjacent cell and the at least one fourth adjacent cell, and there are multiple same adjacent cells, the network device selecting one of the same adjacent cells as the target cell.

Furthermore, the network device initiates a handover request to the network device of the target cell, where the handover request is used to request handover of the terminal device from the current serving cell to the target cell.

As shown in FIG. 5, the source network device sends a handover request to the target network device. The target network device sends a handover confirmation message to the source network device, where the handover confirmation message includes a handover command. The source network device forwards the handover command from the target network device to the terminal device, and the terminal device performs handover alter receiving the handover command.

In an embodiment, the network device may select one adjacent cell from the multiple same adjacent cells as the target cell to be handed over, for example, select the second adjacent cell with a smallest measurement value based on measurement values of the location measurement parameters of the multiple same second adjacent cells, or select the second adjacent cell whose measurement value of the location measurement parameter is the smallest and measurement value of the channel measurement parameter is the largest, etc., which is not limited in the present application.

In an embodiment, the second adjacent cell is a first adjacent cell which satisfies the fourth measurement reporting condition, that is, the measurement result of the second adjacent cell includes the measurement result based on the channel measurement parameter and the measurement result based on the location measurement parameter.

The terminal device measures the channel measurement parameters and location measurement parameters of the current serving cell and each first adjacent cell. If there is at least one second adjacent cell which satisfies a triggering condition for measurement reporting, that is, the fourth measurement reporting condition, for example, within a period of time TTT3, measurement values of the channel measurement parameters of the second adjacent cell and the current serving cell satisfy a certain condition, and measurement values of the location measurement parameters of the second adjacent cell and the current serving cell also satisfy a certain condition, the terminal device reports the measurement results based on the channel measurement parameters to the network device of the current serving cell. These measurement results may be reported via a measurement report.

Among them, the fourth measurement reporting condition is: within a fifth preset time period, a measurement value of the location measurement parameter of the first adjacent cell is less than or equal to a first location measurement threshold, and a measurement value of the location measurement parameter of the current serving cell is greater than or equal to a second location measurement threshold, a measurement value of the channel measurement parameter of the first adjacent cell is greater than or equal to a first channel measurement threshold, and a measurement value of the channel measurement parameter of the current serving cell is less than or equal to a second channel measurement threshold; or, within a sixth preset time period, a difference between a measurement value of the channel measurement parameter of the first adjacent cell and a measurement value of the channel measurement parameter of the current serving cell is greater than or equal to a first relative threshold, and a difference between a measurement value of the location measurement parameter of the current serving cell and a measurement value of the location measurement parameter of the first adjacent cell is greater than or equal to a second relative threshold; or within a seventh preset time period, a measurement value of the location measurement parameter of the first adjacent cell is less than or equal to a first location measurement threshold, and a measurement value of the location measurement parameter of the current serving cell is greater than or equal to a second location measurement threshold, and a difference between a measurement value of the channel measurement parameter of the first adjacent cell and a measurement value of the channel measurement parameter of the current serving cell is greater than or equal to a first relative threshold; or, within an eighth preset time period, a measurement value of the channel measurement parameter of the first adjacent cell is greater than or equal to a first channel measurement threshold, and a measurement value of the channel measurement parameter of the current serving cell is less than or equal to a second channel measurement threshold, and a difference between a measurement value of the location measurement parameter of the current serving cell and a measurement value of the location measurement parameter of the first adjacent cell is greater than or equal to a second relative threshold.

For example, within the fifth preset time period, an RTT of signal transmission between the terminal device and the network device of the first adjacent cell is less than or equal to the first location measurement threshold, and an RTT of signal transmission between the terminal device and the network device of the current serving cell is greater than or equal to the second location measurement threshold, and an RSRP measurement value of the first adjacent cell is greater than or equal to the first channel measurement threshold, and an RSRP measurement value of the current serving cell is less than or equal to the second channel measurement threshold.

For example, within the sixth preset time period, a difference between an RSRP measurement value of the first adjacent cell and an RSRP measurement value of the current serving cell is greater than or equal to the first relative threshold, and a difference between an RTT of signal transmission between the terminal device and the network device of the current serving cell and an RTT of signal transmission between the terminal device and the network device of the first adjacent cell is greater than or equal to the second relative threshold.

Other situations are similar, which will not be repeated here.

When the location measurement parameter and the channel measurement parameter are other parameters, such as a distance between the terminal device and the ground reference point of the current serving cell, an RSRQ, etc., the solution is similar to the above solution, which will not be repeated here.

Figure 6:
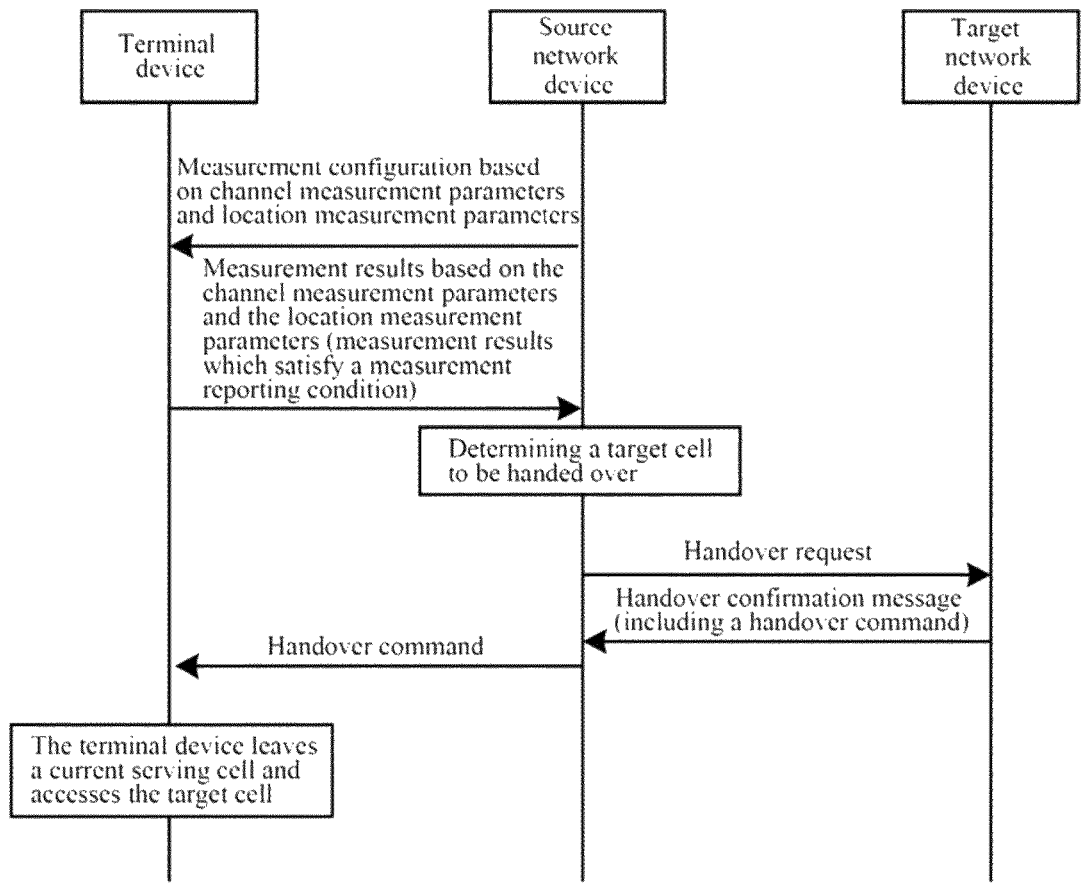
FIG. 6 is an interactive flowchart of another embodiment of an NTN handover method provided by the present application.

In an embodiment, as shown in FIG. 6, the network device (i.e., a source network device) of the current serving cell of the terminal device determines the target network device to be handed over for the terminal device according to the measurement results based on the channel measurement parameters and the location measurement parameters from the terminal device, that is, screens the target cell to be handed over from the second adjacent cell(s).

If the source network device receives the measurement result based on the location measurement parameter and the channel measurement parameter of the terminal device for one second adjacent cell, the source network device determines that the second adjacent cell is the target cell, and the network device of the target cell is the target network device;

if the source network device receives the measurement results based on the location measurement parameters and the channel measurement parameters of the terminal device for multiple second adjacent cells, the source network device selects one second adjacent cell from the reported second adjacent cells as the target cell, and the network device of the target cell is the target network device.

As shown in FIG. 6, the source network device sends a handover request to the target network device. The target network device sends a handover confirmation message to the source network device, where the handover confirmation message includes a handover command. The source network device forwards the handover command from the target network device to the terminal device, and the terminal device performs handover after receiving the handover command.

In an embodiment, the network device may select a second adjacent cell from the multiple second adjacent cells as the target cell to be handed over, for example, select the second adjacent cell with a smallest measurement value based on measurement values of the location measurement parameters of the multiple second adjacent cells, or select the second adjacent cell whose measurement value of the location measurement parameter is the smallest and measurement value of the channel measurement parameter is the largest, etc., which is not limited in the present application.

Among them, the fifth preset time period—the eighth preset time period may be the same or different, and the above thresholds may be the same or different.

In the above, each preset time period and each threshold may be configured by the network device via configuration signaling, such as RRC signaling or other signaling.

Among them, the preset time periods and thresholds for satisfaction of the measurement reporting conditions corresponding to different adjacent cells may be the same or different.

In the above specific implementation, the measurement reporting condition is measurement reporting implemented based on an event-triggered reporting type.

In another embodiment, the measurement reporting condition is measurement reporting triggered based on other measurement reporting types, which is not limited in the embodiment of the present application.

In the above specific implementation, a terminal device side sends measurement results based on channel measurement parameters and/or location measurement parameters to a network device, and the network device determines a target cell to be handed over, and triggers the terminal device to perform handover, therefore, the implementation complexity of the terminal device is relatively less.

Figure 7:
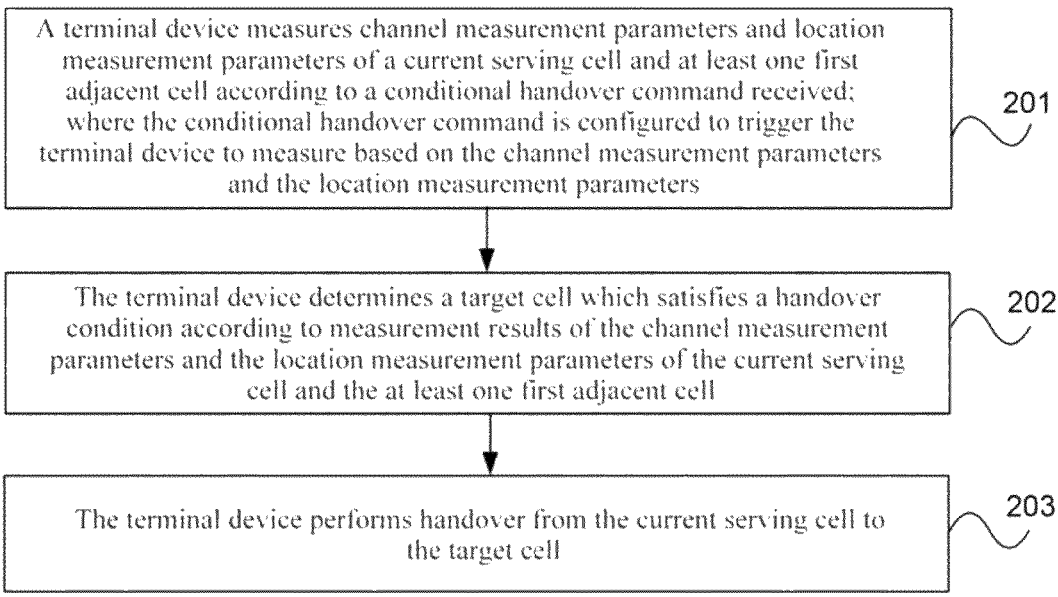
FIG. 7 is a flowchart of another embodiment of an NTN handover method provided by the present application.

FIG. 7 is a flowchart of another embodiment of an NTN handover method provided by the present application, as shown in FIG. 7, specific implementation steps of the embodiment include:

step 201: a terminal device measures channel measurement parameters and location measurement parameters of a current serving cell and at least one first adjacent cell according to a conditional handover command received; where the conditional handover command is configured to trigger the terminal device to measure based on the channel measurement parameters and the location measurement parameters.

In an embodiment, the terminal device receives the conditional handover command sent by the network device before measuring; the conditional handover command includes, for example, measurement event information based on channel measurement parameters and/or location measurement parameters.

Among them, for the current serving cell and each cell in the at least one first adjacent cell, the measurement event is a measurement event based on a channel measurement parameter and/or a location measurement parameter. One or more measurement events may be configured for each cell, and parameters (such as a preset time period, a threshold or the like) corresponding to different measurement events may be different.

The above measurement event information may be carried in one or more conditional handover commands.

In an embodiment, the conditional handover command may further include at least one first adjacent cell list.

Among them, the first adjacent cell is a cell with a same carrier frequency as the current serving cell, or a cell with a different carrier frequency from the current serving cell.

The terminal device measures the current serving cell and each cell in the at least one first adjacent cell.

Step 202: the terminal device determines a target cell which satisfies a handover condition according to measurement results of the channel measurement parameters and the location measurement parameters of the current serving cell and the at least one first adjacent cell.

The terminal device selects the target cell which satisfies the handover condition according to the measurement result of the current serving cell and the measurement result of at least one first adjacent cell, where the number of cells which satisfy the handover condition in the at least one first adjacent cell may be one or more, the terminal device selects one of them as the target cell and performs a handover operation. The handover operation is performed according to the measurement result of the first adjacent cell which satisfies the handover trigger condition.

Step 203: the terminal device performs handover from the current serving cell to the target cell.

The terminal device selects the target network device of the target cell, and directly requests to access the target cell.

In an embodiment, the conditional handover command includes at least one of the following handover conditions for the terminal device to perform handover from the current serving cell to each first adjacent cell: a handover condition based on channel measurement parameters, a handover condition based on channel measurement parameters, or a handover condition based on channel measurement parameters and location measurement parameters.

In an embodiment, step 202 may be implemented by the following steps:

the terminal device determines at least one second adjacent cell which satisfies the handover condition according to the measurement results of the channel measurement parameters and the location measurement parameters of the current serving cell and the at least one first adjacent cell; and the terminal device determines the target cell from the at least one second adjacent cell.

Specifically, the terminal device measures the current serving cell and each cell in the at least one first adjacent cell, and selects the measurement result of the second adjacent cell to be handed over (that is, the measurement result of the second adjacent cell that satisfies the handover condition) according to the measurement result of the current serving cell and the measurement result of the at least one first adjacent cell.

The terminal device may determine the second adjacent cell to be handed over in the following manner.

Manner 1:

if there exists in the at least one first adjacent cell at least one third adjacent cell which satisfies a first handover condition, the terminal device determines whether the at least one third adjacent cell satisfies a second handover condition;

if there exists in the at least one third adjacent cell at least one fourth adjacent cell which satisfies the second handover condition, the terminal device determines the second adjacent cell from the at least one fourth adjacent cell;

where the first handover condition is a handover condition based on channel measurement parameters, and correspondingly, the second handover condition is a handover condition based on location measurement parameters; or, the first handover condition is a handover condition based on location measurement parameters, and correspondingly, the second handover condition is a handover condition based on channel measurement parameters.

Specifically, the terminal device respectively processes the measurement result based on the channel measurement parameter and the measurement result based on the location measurement parameter. For the third adjacent cell, after a measurement result based on one of the measurement parameters satisfies the handover condition, the terminal device continues to wait for a measurement result based on the other measurement parameter to satisfy the handover condition. As a result, after the measurement result based on the other measurement parameter satisfies the handover condition for handover, the third adjacent cell is the fourth adjacent cell.

In an embodiment, if there exists at least one third adjacent cell which satisfies the handover condition based on channel measurement parameters, for example, within a period of time TTT4, measurement values of the channel measurement parameters of the third adjacent cell and the current serving cell satisfy a certain condition, then the terminal device determines that the third adjacent cell satisfies the handover condition based on channel measurement parameters, and if there exists in the third adjacent cell at least one fourth adjacent cell which satisfies the handover condition based on location measurement parameters, for example, within a period of time TTT5, measurement values of the location measurement parameters of the fourth adjacent cell and the current serving cell satisfy a certain condition, then the terminal device determines that the fourth adjacent cell satisfies the handover condition based on location measurement parameters.

In an embodiment, the handover condition based on channel measurement parameters is: within a ninth preset time period, a measurement value of the channel measurement parameter of the first adjacent cell is greater than or equal to a third channel measurement threshold, and a measurement value of the channel measurement parameter of the current serving cell is less than or equal to a fourth channel measurement threshold; or, the handover condition based on channel measurement parameters is: within a tenth preset time period, a difference between a measurement value of the channel measurement parameter of the first adjacent cell and a measurement value of the channel measurement parameter of the current serving cell is greater than or equal to a third relative thresholds.

In an embodiment, the handover condition based on location measurement parameters is: within an eleventh preset time period, a measurement value of the location measurement parameter of the first adjacent cell is less than or equal to a third location measurement threshold, and a measurement value of the location measurement parameter of the current serving cell is greater than or equal to a fourth location measurement threshold; or, the handover condition based on location measurement parameters is: within a twelfth preset time period, a difference between a measurement value of the location measurement parameter of the current serving cell and a measurement value of the location measurement parameter of the first adjacent cell is greater than or equal to a fourth relative threshold.

In an embodiment, the terminal device may determine whether the fourth adjacent cell is the second adjacent cell in the following manners.

Manner 1-1:
the terminal device takes at least one fourth adjacent cell as the at least one second adjacent cell.

In this manner 1-1, the terminal device does not need to judge whether the measurement result of the measurement parameter that meets the handover condition still satisfies the handover condition corresponding to the measurement result, and the terminal device directly takes the fourth adjacent cell as the second adjacent cell, that is, the fourth adjacent cells are all second adjacent cells to be handed over.

Manner 1-2:
the terminal device determines whether the at least one fourth adjacent cell satisfies the first handover condition; and
the terminal device takes the fourth adjacent cell as the second adjacent cell if the fourth adjacent cell satisfies the first handover condition.

For the third adjacent cell, after the measurement result based on one of the measurement parameters satisfies the handover condition, the terminal device continues to wait for the measurement result based on the other measurement parameter to satisfy the handover condition, and after the measurement result based on the other measurement parameter satisfies the handover condition, the third adjacent cell is the fourth adjacent cell. The terminal device further needs to determine whether the measurement result of the above one of the measurement parameters of the fourth adjacent cell that satisfies the handover condition before still satisfies the handover condition corresponding to the measurement result of the measurement parameter at this time; if it satisfies, the fourth adjacent cell is the second adjacent cell; otherwise, the fourth adjacent cell is not the second adjacent cell.

Manner 1-3:
the terminal device determines whether the at least one fourth adjacent cell satisfies a leaving condition corresponding to the first handover condition; and
the terminal device takes the fourth adjacent cell as the second adjacent cell if the fourth adjacent cell does not satisfy the leaving condition corresponding to the first handover condition.

For the third adjacent cell, after the measurement result based on one of the measurement parameters satisfies the handover condition, the terminal device continues to wait for the measurement result based on the other measurement parameter to satisfy the handover condition, and after the measurement result based on the other measurement parameter satisfies the handover condition, the third adjacent cell is the fourth adjacent cell. The terminal device further needs to determine whether the measurement result of the above one of the measurement parameters of the fourth adjacent cell that satisfies the handover condition before still satisfies the leaving condition corresponding to the measurement result of the measurement parameter at this time; if it does not satisfy, the fourth adjacent cell is the second adjacent cell; otherwise, the fourth adjacent cell is not the second adjacent cell.

In an embodiment, if the first handover condition is a handover condition based on channel measurement parameters, a leaving condition corresponding to the first handover condition is:

within the ninth preset time period, the measurement value of the channel measurement parameter of the first adjacent cell is less than a fifth channel measurement threshold, and/or the measurement value of the channel measurement parameter of the current serving cell is greater than a sixth channel measurement threshold; or,
within the tenth preset time period, the difference between the measurement value of the channel measurement parameter of the first adjacent cell and the measurement value of the channel measurement parameter of the current serving cell is less than a fifth relative threshold.

In an embodiment, the fifth channel measurement threshold may be obtained by subtracting an offset from the third channel measurement threshold, and the sixth channel measurement threshold may be obtained by adding an offset to the fourth channel measurement threshold, where the offsets may be the same or different.

The fifth relative threshold may be obtained by subtracting an offset from the third relative threshold.

In an embodiment, if the first handover condition is a handover condition based on location measurement parameters, a leaving condition corresponding to the first handover condition is:

within the eleventh preset time period, the measurement value of the location measurement parameter of the first adjacent cell is greater than a seventh location measurement threshold, and/or the measurement value of the location measurement parameter of the current serving cell is smaller than an eighth location measurement value threshold; or,
within the twelfth preset time period, the difference between the measurement value of the location measurement parameter of the current serving cell and the measurement value of the location measurement parameter of the first adjacent cell is less than a sixth relative threshold.

In an embodiment, the seventh location measurement threshold may be obtained by adding an offset to the third location measurement threshold, and the eighth location measurement threshold may be obtained by subtracting an offset from the fourth location measurement threshold, where the offsets may be the same or different.

The sixth relative threshold may be obtained by subtracting an offset from the fourth relative threshold.

Figure 8:
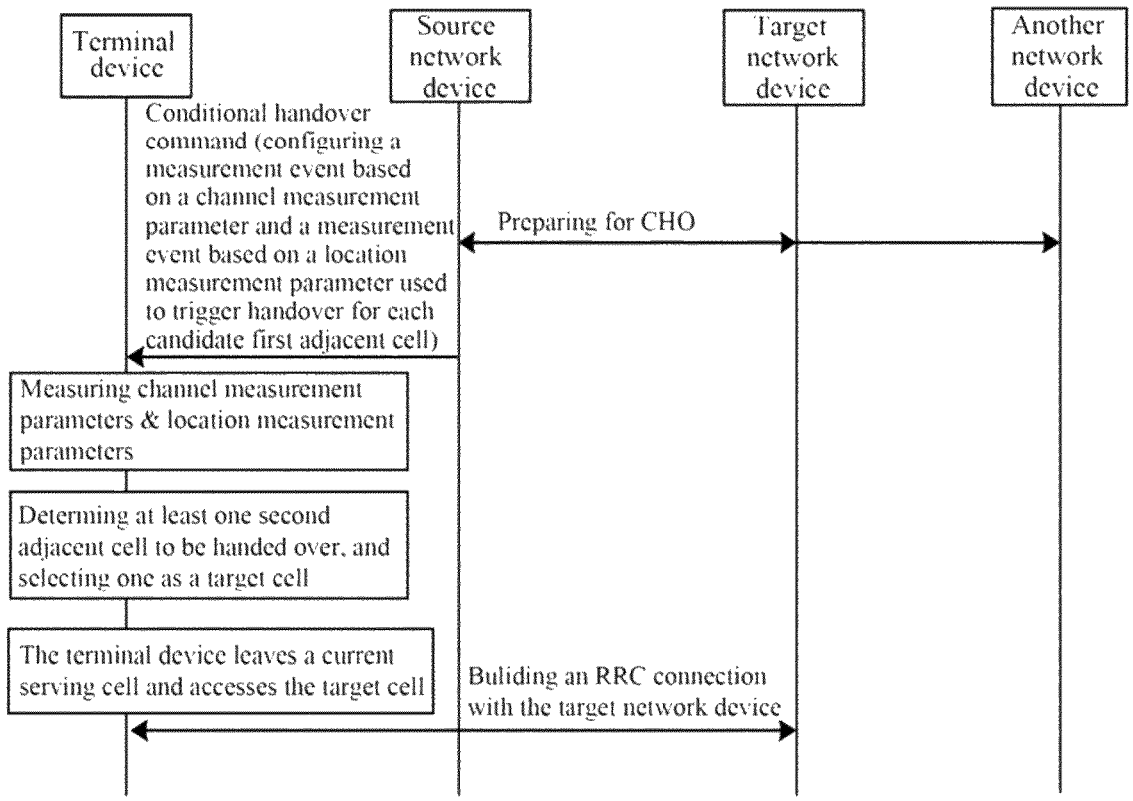
FIG. 8 is an interactive flowchart of yet another embodiment of an NTN handover method provided by the present application.

As shown in FIG. 8, a source network device (i.e., the network device of the current serving cell) prepares for conditional handover (CHO); the source network device performs measurement configuration, and configures multiple corresponding measurement events (at least one measurement event based on a channel measurement parameter and at least one measurement event based on a location measurement parameter) for each candidate first adjacent cell, and configures multiple handover conditions corresponding to each candidate first adjacent cell. The terminal device measures the channel measurement parameters of the current serving cell and each first adjacent cell according to the conditional handover command from the network side, and measures the location measurement parameters of the current serving cell and each first adjacent cell. The terminal device selects one of the second adjacent cell(s) to be handed over which satisfies the handover condition as the target cell according to the measurement results of the channel measurement parameters and the measurement results of the location measurement parameters, and performs handover, that is, leaves the current serving cell and accesses the target cell. The terminal device establishes a connection with the target network device of the target cell, for example, an RRC connection. Among them, the parameters such as a preset time period and a threshold in respective measurement events may be different.

Manner 2:
  if there exists in the at least one first adjacent cell at least one fifth adjacent cell which satisfies the handover condition based on channel measurement parameters and location measurement parameters, the terminal device takes the at least one fifth adjacent cell as the at least one second adjacent cell.

In an embodiment, the second adjacent cell is a first adjacent cell which satisfies the handover condition based on channel measurement parameters and location measurement parameters, that is, a measurement result of the second adjacent cell includes a measurement result based on a channel measurement parameter and a measurement result based on a location measurement parameter.

The terminal device measures the channel measurement parameters of the current serving cell and each first adjacent cell according to the conditional handover command from the network side. If there exists at least one second adjacent cell which satisfies the handover condition based on channel measurement parameters and location measurement parameters, for example, within a period of time TTT6, measurement values of the channel measurement parameters of the second adjacent cell and the current serving cell satisfy a certain condition, and measurement values of the location measurement parameters of the second adjacent cell and the current serving cell satisfy a certain condition, the terminal device selects one of the second adjacent cell(s) to perform a handover operation.

Figure 9:
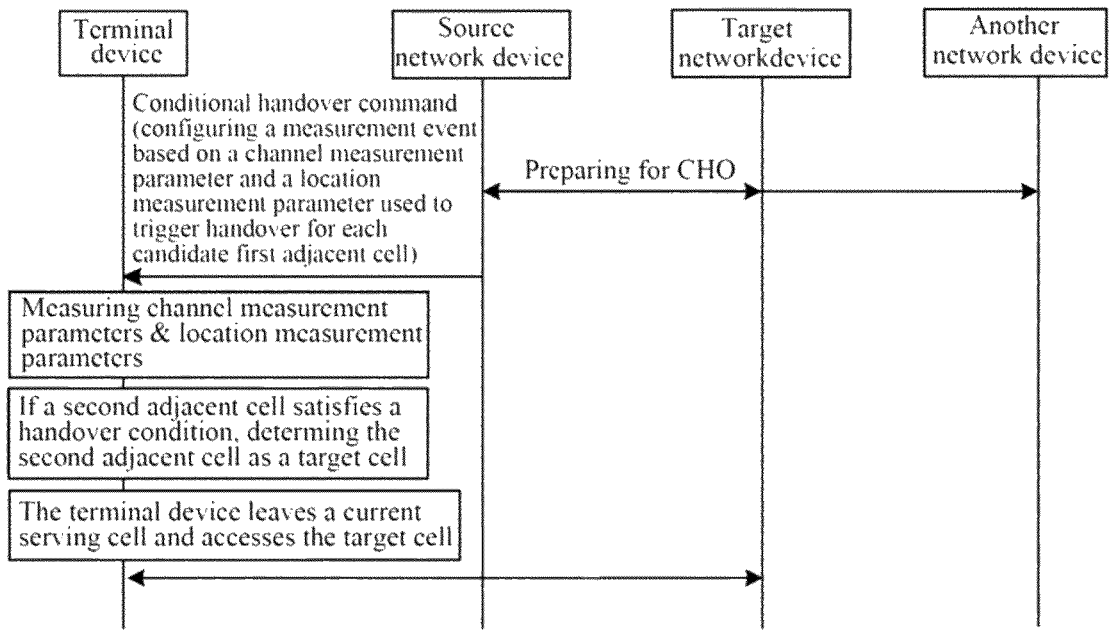
FIG. 9 is an interactive flowchart of yet another embodiment of an NTN handover method provided by the present application.

As shown in FIG. 9, a source network device (i.e., the network device of the current serving cell) prepares for conditional handover (CHO); the source network device performs measurement configuration, and configures at least one corresponding measurement event based on a channel measurement parameter and a location measurement parameter for each candidate first adjacent cell, and configures a handover condition corresponding to each candidate first adjacent cell. The terminal device measures the channel measurement parameters of the current serving cell and each first adjacent cell according to the conditional handover command from the network side, and measures the location measurement parameters of the current serving cell and each first adjacent cell. The terminal device selects one of the second adjacent cell(s) to be handed over which satisfies the handover condition as the target cell according to the measurement results of the channel measurement parameters and the measurement results of the location measurement parameters, and performs handover, that is, leaves the current serving cell and accesses the target cell. The terminal device establishes a connection with the target network device of the target cell, for example, an RRC connection.

Among them, the parameters such as a preset time period and a threshold in respective measurement events may be different.

In an embodiment, the handover condition based on channel measurement parameters and location measurement parameters is: within a thirteenth preset time period, a measurement value of the channel measurement parameter of the first adjacent cell is greater than or equal to a third channel measurement threshold, and a measurement value of the channel measurement parameter of the current serving cell is less than or equal to a fourth channel measurement threshold, a measurement value of the location measurement parameter of the first adjacent cell is less than or equal to a third location measurement threshold, and a measurement value of the location measurement parameter of the current serving cell is greater than or equal to a fourth location measurement threshold; or, the handover condition based on channel measurement parameters and location measurement parameters is: within a fourteenth preset time period, a difference between a measurement value of the channel measurement parameter of the first adjacent cell and a measurement value of the channel measurement parameter of the current serving cell is greater than or equal to a third relative threshold, and a difference between a measurement value of the location measurement parameter of the current serving cell and a measurement value of the location measurement parameter of the first adjacent cell is greater than or equal to a fourth relative threshold; or
  the handover condition based on channel measurement parameters and location measurement parameters is: within a fifteenth preset time period, a measurement value of the channel measurement parameter of the first adjacent cell is greater than or equal to a third channel measurement threshold, and a measurement value of the channel measurement parameter of the current serving cell is less than or equal to a fourth channel measurement threshold, and a difference between a measurement value of the location measurement parameter of the current serving cell and a measurement value of the location measurement parameter of the first adjacent cell is greater than or equal to a fourth relative threshold; or,
  the handover condition based on channel measurement parameters and location measurement parameters is: within a sixteenth preset time period, a difference between a measurement value of the channel measurement parameter of the first adjacent cell and a measurement value of the channel measurement parameter of the current serving cell is greater than or equal to a third relative threshold, a measurement value of the location measurement parameter of the first adjacent cell is less than or equal to a third location measurement threshold, and a measurement value of the location measurement parameter of the current serving cell is greater than or equal to a fourth location measurement threshold.

For example, within the thirteenth preset time period, an RTT of signal transmission between the terminal device and the network device of the first adjacent cell is less than or equal to the third location measurement threshold, and an RTT between the terminal device and the network device of the current serving cell is greater than or equal to the fourth location measurement threshold, and an RSRP measurement value of the first adjacent cell is greater than or equal to the third channel measurement threshold, and an RSRP measurement value of the current serving cell is less than or equal to the fourth channel measurement threshold.

For example, within the fourteenth preset time period, a difference between an RSRP measurement value of the first adjacent cell and an RSRP measurement value of the current serving cell is greater than or equal to the third relative threshold, and a difference between an RTT of signal transmission between the terminal device and the network device of the current serving cell and an RTT of signal transmission between the terminal device and the network device of the first adjacent cell is greater than or equal to the fourth relative threshold.

Other situations are similar, which will not be repeated here.

When the location measurement parameter and the channel measurement parameter are other parameters, such as a distance between the terminal device and the ground reference point of the current serving cell, an RSRQ, etc., the solution is similar to the above solution, which will not be repeated here.

In an embodiment, if there is one second adjacent cell, the terminal device initiates a handover request to a network device of the second adjacent cell, where the handover request is used to request handover from the current serving cell to the second adjacent cell;

if there are multiple second adjacent cells, the terminal device selects a network device of one of the second adjacent cells to initiate a handover request, where the handover request is used to request handover from the current serving cell to one of the second adjacent cells.

That is, the second adjacent cell to be selected is used as the target cell, and a network device of the target cell is used as the target network device, and access of the target cell is requested.

In an embodiment, the terminal device may select a second adjacent cell from the multiple second adjacent cells as the target cell to be handed over, for example, select the second adjacent cell with a smallest measurement value based on measurement values of the location measurement parameters of the multiple second adjacent cells, or select the second adjacent cell whose measurement value of the location measurement parameter is the smallest and measurement value of the channel measurement parameter is the largest, etc., which is not limited in the present application.

Among them, the ninth preset time period—the sixteenth preset time period may be the same or different, and the above thresholds may be the same or different.

In the above, each preset time period and each threshold may be configured by the network device via configuration signaling, such as RRC signaling or other signaling.

Among them, the preset time periods and thresholds for satisfaction of the handover conditions corresponding to different adjacent cells may be the same or different.

In the above specific implementation, a terminal device side performs handover according to measurement results based on channel measurement parameters and location measurement parameters, without sending the measurement results to a network side, thereby saving signaling overhead and reducing handover delay.

Figure 10:
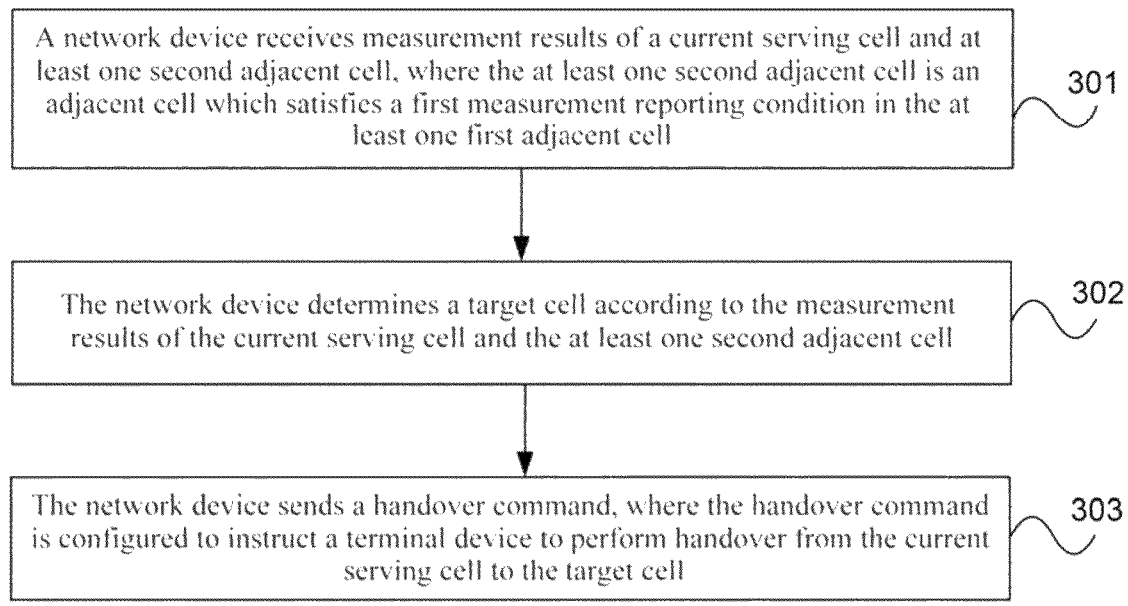
FIG. 10 is a flowchart of yet another embodiment of an NTN handover method provided by the present application.

FIG. 10 is a flowchart of yet another embodiment of an NTN handover method provided by the present application, as shown in FIG. 10, specific implementation steps of the embodiment include:

step 301: a network device receives measurement results of a current serving cell and at least one second adjacent cell, where the at least one second adjacent cell is an adjacent cell which satisfies a first measurement reporting condition in the at least one first adjacent cell;

step 302: the network device determines a target cell according to the measurement results of the current serving cell and the at least one second adjacent cell; and step 303: the network device sends a handover command, where the handover command is configured to instruct a terminal device to perform handover from the current serving cell to the target cell.

In an embodiment, the terminal device receives measurement configuration information sent by the network device before measuring; for example, the measurement configuration information includes: measurement event information based on a channel measurement parameter and/or a location measurement parameter.

In an embodiment, the network device may send after the terminal device accesses the network device, or after the terminal device registers in the NTN network, which is not limited in the embodiment of the present application.

Among them, for the current serving cell and each cell in the at least one first adjacent cell, the measurement event is a measurement event based on a channel measurement parameter and/or a location measurement parameter. One or more measurement events may be configured for each cell, and parameters (such as a preset time period, a threshold or the like) corresponding to different measurement events may be different.

Among them, the network device may configure the terminal device with: measurement event information based on a channel measurement parameter, measurement event information based on a location measurement parameter, or measurement event information based on a channel measurement parameter and a location measurement parameter, where the above measurement event information may be carried in one or more measurement configuration information.

Among them, the first adjacent cell is a cell with the same carrier frequency as the current serving cell, or a cell with a different carrier frequency from the current serving cell. For each configured carrier frequency to be measured, the network may configure a cell offset list (a list of cells with a specific frequency offset from the carrier frequency), a list of blacklisted cells and a list of whitelisted cells.

The terminal device measures the channel measurement parameters and location measurement parameters of the current serving cell and each first adjacent cell according to the measurement configuration information from the network side. The terminal device performs measurement reporting according to the measurement results of the channel measurement parameters and the measurement results of the location measurement parameters of the current serving cell and each cell of the first adjacent cell(s), and the network device triggers handover, that is, the network device selects a target network device of the target cell and sends a handover request.

In an embodiment, the terminal device may report the measurement results of the first adjacent cells which satisfy the measurement reporting condition and the measurement result of the current serving cell to the network device, and the network device selects the target cell to be handed over from the first adjacent cells which meet the measurement reporting condition.

In an embodiment, the above measurement reporting condition may be carried in the measurement configuration information.

In another embodiment, the measurement event information may also include the measurement reporting condition, which is not limited in the present application.

In an embodiment, the channel measurement parameter includes at least one of the following: a reference signal received power RSRP or a reference signal received quality RSRQ.

In an embodiment, the location measurement parameter includes at least one of the following: a round-trip transmission time RTT between the terminal device and the network device, or a distance between the terminal device and a ground reference point.

The method of the embodiment, for an NTN system, measurement results of channel measurement parameters and location measurement parameters of a terminal device are considered simultaneously when a target cell is selected for the terminal device, it is possible to know that the terminal device is moving to a target cell in time since the measurement results of the location measurement parameters are considered, thus ensuring the terminal device to perform handover to the target cell in time during the moving process, and avoiding a situation that the terminal device has moved to the target cell but has not yet triggered handover, thereby effectively ensuring a service continuity of a terminal device of a user during a moving process, improving handover robustness, consequently enabling the user to obtain a better experience.

In an embodiment, the network device sends a first measurement reporting condition corresponding to a measurement result of each first adjacent cell; where the first measurement reporting condition includes at least one of the following: a second measurement reporting condition based on channel measurement parameters, a third measurement reporting condition based on location measurement parameters, or a fourth measurement reporting condition based on channel measurement parameters and location measurement parameters.

In an embodiment, the second adjacent cell is a first adjacent cell which satisfies the second measurement reporting condition, that is, the measurement result of the second adjacent cell includes the measurement result based on the channel measurement parameter.

The terminal device measures the channel measurement parameters of the current serving cell and each first adjacent cell according to the measurement configuration information from the network side. If there is at least one second adjacent cell which satisfies a triggering condition for measurement reporting, that is, the second measurement reporting condition, for example, within a period of time TTT1, measurement values of the channel measurement parameters of the second adjacent cell and the current serving cell satisfy a certain condition, the terminal device reports the measurement results based on the channel measurement parameters to the network device of the current serving cell. These measurement results may be reported via a measurement report.

In an embodiment, the second measurement reporting condition is: within a first preset time period, a measurement value of the channel measurement parameter of the first adjacent cell is greater than or equal to a first channel measurement threshold, and a measurement value of the channel measurement parameter of the current serving cell is less than or equal to a second channel measurement threshold; or, the second measurement reporting condition is: within a second preset time period, a difference between a measurement value of the channel measurement parameter of the first adjacent cell and a measurement value of the channel measurement parameter of the current serving cell is greater than or equal to a first relative threshold.

Among them, the first channel measurement threshold and the second channel measurement threshold may be the same or different.

Among them, the first preset time period and the second preset time period may be the same or different.

In an embodiment, the second adjacent cell is a first adjacent cell which satisfies the third measurement reporting condition, that is, the measurement result of the second adjacent cell includes the measurement result based on the location measurement parameter.

The terminal device measures the location measurement parameters of the current serving cell and each first adjacent cell according to the measurement configuration information from the network side. If there is at least one second adjacent cell which satisfies a triggering condition for measurement reporting, that is, the third measurement reporting condition, for example, within a period of time TTT2, measurement values of the location measurement parameters of the second adjacent cell and the current serving cell satisfy a certain condition, the terminal device reports the measurement results based on the location measurement parameters to the network device of the current serving cell. These measurement results may be reported via a measurement report.

In an embodiment, the third measurement reporting condition is: within a third preset time period, a measurement value of the location measurement parameter of the first adjacent cell is less than or equal to a first location measurement threshold, and a measurement value of the location measurement parameter of the current serving cell is greater than or equal to a second location measurement threshold; or, the third measurement reporting condition is: within a fourth preset time period, a difference between a measurement value of the location measurement parameter of the current serving cell and a measurement value of the location measurement parameter of the first adjacent cell is greater than or equal to a second relative threshold.

In an embodiment, the fourth measurement reporting condition is: within a fifth preset time period, a measurement value of the location measurement parameter of the first adjacent cell is less than or equal to a first location measurement threshold, and a measurement value of the location measurement parameter of the current serving cell is greater than or equal to a second location measurement threshold, a measurement value of the channel measurement parameter of the first adjacent cell is greater than or equal to a first channel measurement threshold, and a measurement value of the channel measurement parameter of the current serving cell is less than or equal to a second channel measurement threshold; or, the fourth measurement reporting condition is: within a sixth preset time period, a difference between a measurement value of the channel measurement parameter of the first adjacent cell and a measurement value of the channel measurement parameter of the current serving cell is greater than or equal to a first relative threshold, and a difference between a measurement value of the location measurement parameter of the current serving cell and a measurement value of the location measurement parameter of the first adjacent cell is greater than or equal to a second relative threshold; or the fourth measurement reporting condition is: within a seventh preset time period, a measurement value of the location measurement parameter of the first adjacent cell is less than or equal to a first location measurement threshold, and a measurement value of the location measurement parameter of the current serving cell is greater than or equal to a second location measurement threshold, and a difference between a measurement value of the channel measurement parameter of the first adjacent cell and a measurement value of the channel measurement parameter of the current serving cell is greater than or equal to a first relative threshold; or, the fourth measurement reporting condition is: within an eighth preset time period, a measurement value of the channel measurement parameter of the first adjacent cell is greater than or equal to a first channel measurement threshold, and a measurement value of the channel measurement parameter of the current serving cell is less than or equal to a second channel measurement threshold, and a difference between a measurement value of the location measurement parameter of the current serving cell and a measurement value of the location measurement parameter of the first adjacent cell is greater than or equal to a second relative threshold.

Among them, the first location measurement threshold and the second location measurement threshold may be the same or different.

Among them, the third preset time period and the fourth preset time period may be the same or different.

Among them, the first relative threshold and the second relative threshold may be the same or different.

In an embodiment, as shown in FIG. 5, the network device (i.e., a source network device) of the current serving cell of the terminal device determines the target network device to be handed over for the terminal device according to measurement results based on the channel measurement parameters and measurement results based on the location measurement parameters from the terminal device, that is, screens the target cell to be handed over from the second adjacent cell(s).

If the source network device receives the measurement result based on the location measurement parameter and the measurement result based on the channel measurement parameter of the terminal device for one second adjacent cell, the source network device determines that the second adjacent cell is the target cell, and the network device of the target cell is the target network device;

if the source network device receives the measurement results based on the location measurement parameters and the measurement results based on the channel measurement parameters of the terminal device for multiple second adjacent cells, the source network device selects one second adjacent cell from the reported second adjacent cells as the target cell, and the network device of the target cell is the target network device.

Among them, the multiple second adjacent cells include: a third adjacent cell measured based on the channel measurement parameter and a fourth adjacent cell measured based on the location measurement parameter, and a common adjacent cell in the third adjacent cell and the fourth adjacent cell is selected as the target cell.

In an embodiment, if the measurement result of the current serving cell includes a measurement result based on a channel measurement parameter and a location measurement parameter, the measurement result of the at least one second adjacent cell includes a measurement result based on a channel measurement parameter of at least one third adjacent cell and a measurement result based on a location measurement parameter of at least one fourth adjacent cell, where the second adjacent cell includes the third adjacent cell and the fourth adjacent cell, where the third adjacent cell and the fourth adjacent cell may be the same cell or different cells (if they are different cells, the number of second adjacent cell is multiple), the network device may select the target cell according to the following manner, and perform a handover operation: the determining the target cell according to the measurement results of the current serving cell and the at least one second adjacent cell includes:

if there exists at least one same adjacent cell in the at least one third adjacent cell and the at least one fourth adjacent cell, and there is one same adjacent cell, the network device taking the same adjacent cell as the target cell;

if there exists at least one same adjacent cell in the at least one third adjacent cell and the at least one fourth adjacent cell, and there are multiple same adjacent cells, the network device selecting one of the same adjacent cells as the target cell.

Furthermore, the network device initiates a handover request to the network device of the target cell, where the handover request is used to request handover of the terminal device from the current serving cell to the target cell.

In an embodiment, if the measurement results of the current serving cell and the at least one second adjacent cell respectively include a measurement result based on a channel measurement parameter and a location measurement parameter, the determining the target cell according to the measurement results of the current serving cell and the at least one second adjacent cell by the network device includes:

if there is one second adjacent cell, the network device taking the second adjacent cell as the target cell;

if there are multiple second adjacent cells, the network device selecting one of the second adjacent cells as the target cell.

In an embodiment, as shown in FIG. 6, the network device (i.e., a source network device) of the current serving cell of the terminal device determines the target network device to be handed over for the terminal device according to the measurement results based on the channel measurement parameters and the location measurement parameters from the terminal device, that is, screens the target cell to be handed over from the second adjacent cell(s).

If the source network device receives the measurement result based on the location measurement parameter and the channel measurement parameter of the terminal device for one second adjacent cell, the source network device determines that the second adjacent cell is the target cell, and the network device of the target cell is the target network device;

if the source network device receives the measurement results based on the location measurement parameters and the channel measurement parameters of the terminal device for multiple second adjacent cells, the source network device selects one second adjacent cell from the reported second adjacent cells as the target cell, and the network device of the target cell is the target network device.

As shown in FIG. 6, the source network device sends a handover request to the target network device. The target network device sends a handover confirmation message to the source network device, where the handover confirmation message includes a handover command. The source network device forwards the handover command from the target network device to the terminal device, and the terminal device performs handover after receiving the handover command.

In an embodiment, the network device may select a second adjacent cell from the multiple second adjacent cells as the target cell to be handed over, for example, select the second adjacent cell with a smallest measurement value based on measurement values of the location measurement parameters of the multiple second adjacent cells, or select the second adjacent cell whose measurement value of the location measurement parameter is the smallest and measurement value of the channel measurement parameter is the largest, etc., which is not limited in the present application.

Among them, the fifth preset time period—the eighth preset time period may be the same or different, and the above thresholds may be the same or different.

In the above, each preset time period and each threshold may be configured by the network device via configuration signaling, such as RRC signaling or other signaling.

Among them, the preset time periods and thresholds for satisfaction of the measurement reporting conditions corresponding to different adjacent cells may be the same or different.

In the above specific implementation, the measurement reporting condition is measurement reporting implemented based on an event-triggered reporting type.

In another embodiment, the measurement reporting condition is measurement reporting triggered based on other measurement reporting types, which is not limited in the embodiment of the present application.

The implementation principle and technical effect of the method in the embodiment are similar to those of the foregoing method embodiments at the terminal device side, reference may be made to the foregoing embodiments, and details will not be repeated here.

In another embodiment, a network device sends a conditional handover command to a terminal device, and the terminal device measures channel measurement parameters and location measurement parameters of a current serving cell and at least one first adjacent cell according to the conditional handover command received; where the conditional handover command is configured to trigger the terminal device to measure based on the channel measurement parameters and the location measurement parameters.

In an embodiment, the conditional handover command includes, for example, measurement event information based on a channel measurement parameter and/or a location measurement parameter.

Among them, for the current serving cell and each cell in the at least one first adjacent cell, the measurement event is a measurement event based on a channel measurement parameter and/or a location measurement parameter. One or more measurement events may be configured for each cell, and parameters (such as a preset time period, a threshold or the like) corresponding to different measurement events may be different.

The above measurement event information may be carried in one or more conditional handover commands.

In an embodiment, the conditional handover command may further include at least one first adjacent cell list.

Among them, the first adjacent cell is a cell with a same carrier frequency as the current serving cell, or a cell with a different carrier frequency from the current serving cell.

The terminal device determines a target cell which satisfies a handover condition according to measurement results of the channel measurement parameters and the location measurement parameters of the current serving cell and the at least one first adjacent cell.

The terminal device selects the target cell which satisfies the handover condition according to the measurement result of the current serving cell and the measurement result of at least one first adjacent cell, where the number of cells which satisfy the handover condition in the at least one first adjacent cell may be one or more, the terminal device selects one of them as the target cell and performs a handover operation. The handover operation is performed according to the measurement result of the first adjacent cell which satisfies the handover trigger condition.

The implementation principle and technical effect of the above specific implementation are similar to those of the foregoing method embodiments at the terminal device side, reference may be made to the foregoing embodiments, and will not be repeated here.

Figure 11:
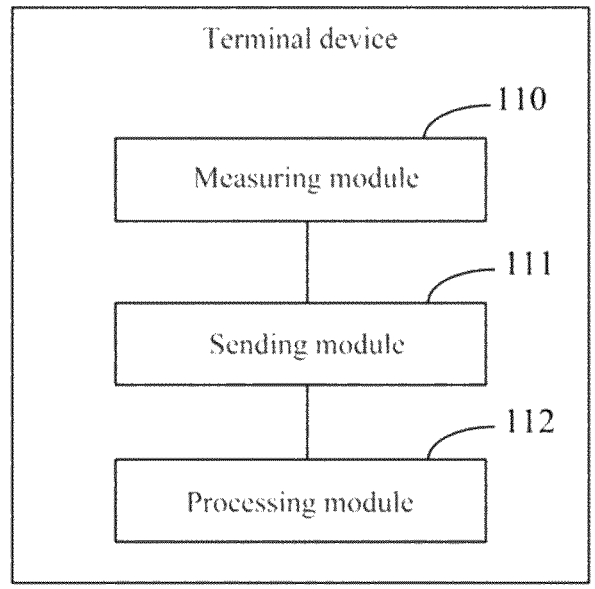
FIG. 11 is a schematic structural diagram of Embodiment I of a terminal device provided by the present application.

FIG. 11 is a schematic structural diagram of Embodiment I of a terminal device provided by the present application. As shown in FIG. 11, the terminal device includes:

a measuring module 110, configured to measure channel measurement parameters and location measurement parameters of a current serving cell and at least one first adjacent cell;

a sending module 111, configured to measurement results of the current serving cell and at least one second adjacent cell to a network device; where the second adjacent cell is an adjacent cell which satisfies a first measurement reporting condition in the at least one first adjacent cell; where the measurement results are configured to instruct the network device to determine a target cell to be handed over for the terminal device from the at least one second adjacent cell; and a processing module 112, configured to perform handover according to a handover command received, where the handover command is configured to instruct the terminal device to perform handover from the current serving cell to the target cell.

In a possible implementation, it further includes:

a receiving module, configured to receive a first measurement reporting condition corresponding to a measurement result of each of the at least one first adjacent cell, where the first measurement reporting condition includes at least one of the following: a second measurement reporting condition based on channel measurement parameters, a third measurement reporting condition based on location measurement parameters, or a fourth measurement reporting condition based on channel measurement parameters and location measurement parameters.

In a possible implementation, the second measurement reporting condition is: within a first preset time period, a measurement value of the channel measurement parameter of the first adjacent cell is greater than or equal to a first channel measurement threshold, and a measurement value of the channel measurement parameter of the current serving cell is less than or equal to a second channel measurement threshold; or, the second measurement reporting condition is: within a second preset time period, a difference between a measurement value of the channel measurement parameter of the first adjacent cell and a measurement value of the channel measurement parameter of the current serving cell is greater than or equal to a first relative threshold.

In a possible implementation, the third measurement reporting condition is: within a third preset time period, a measurement value of the location measurement parameter of the first adjacent cell is less than or equal to a first location measurement threshold, and a measurement value of the location measurement parameter of the current serving cell is greater than or equal to a second location measurement threshold; or, the third measurement reporting condition is: within a fourth preset time period, a difference between a measurement value of the location measurement parameter of the current serving cell and a measurement value of the location measurement parameter of the first adjacent cell is greater than or equal to a second relative threshold.

In a possible implementation, the fourth measurement reporting condition is: within a fifth preset time period, a measurement value of the location measurement parameter of the first adjacent cell is less than or equal to a first location measurement threshold, and a measurement value of the location measurement parameter of the current serving cell is greater than or equal to a second location measurement threshold, a measurement value of the channel measurement parameter of the first adjacent cell is greater than or equal to a first channel measurement threshold, and a measurement value of the channel measurement parameter of the current serving cell is less than or equal to a second channel measurement threshold; or, the fourth measurement reporting condition is: within a sixth preset time period, a difference between a measurement value of the channel measurement parameter of the first adjacent cell and a measurement value of the channel measurement parameter of the current serving cell is greater than or equal to a first relative threshold, and a difference between a measurement value of the location measurement parameter of the current serving cell and a measurement value of the location measurement parameter of the first adjacent cell is greater than or equal to a second relative threshold; or the fourth measurement reporting condition is: within a seventh preset time period, a measurement value of the location measurement parameter of the first adjacent cell is less than or equal to a first location measurement threshold, and a measurement value of the location measurement parameter of the current serving cell is greater than or equal to a second location measurement threshold, and a difference between a measurement value of the channel measurement parameter of the first adjacent cell and a measurement value of the channel measurement parameter of the current serving cell is greater than or equal to a first relative threshold; or, the fourth measurement reporting condition is: within an eighth preset time period, a measurement value of the channel measurement parameter of the first adjacent cell is greater than or equal to a first channel measurement threshold, and a measurement value of the channel measurement parameter of the current serving cell is less than or equal to a second channel measurement threshold, and a difference between a measurement value of the location measurement parameter of the current serving cell and a measurement value of the location measurement parameter of the first adjacent cell is greater than or equal to a second relative threshold.

In a possible implementation, the channel measurement parameter includes at least one of the following: a reference signal received power RSRP or a reference signal received quality RSRQ.

In a possible implementation, the location measurement parameter includes at least one of the following: a round-trip transmission time RTT between the terminal device and the network device, or a distance between the terminal device and a ground reference point.

The terminal device provided by any of the above implementations is used to execute technical solutions of the terminal device side in any of the foregoing method embodiments, and the implementation principles and technical effects thereof are similar, which will not be repeated here.

Figure 12:
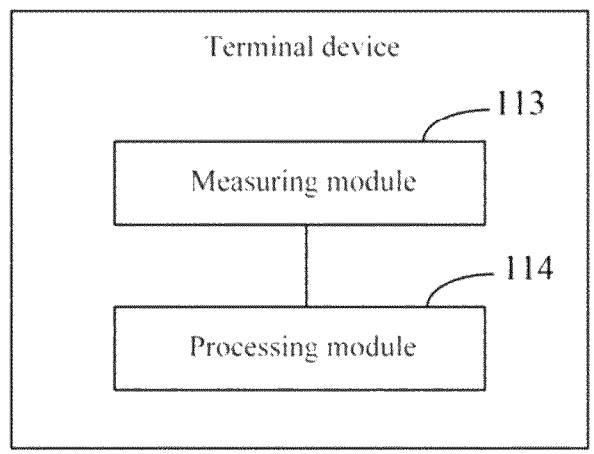
FIG. 12 is a schematic structural diagram of Embodiment II of a terminal device provided by the present application.

FIG. 12 is a schematic structural diagram of Embodiment II of a terminal device provided by the present application. As shown in FIG. 12, the terminal device includes:

a measuring module 113, configured to measure channel measurement parameters and location measurement parameters of a current serving cell and at least one first adjacent cell according to a conditional handover command received; where the conditional handover command is configured to trigger the terminal device to measure based on the channel measurement parameters and the location measurement parameters; and a processing module 114, configured to determine a target cell which satisfies a handover condition according to measurement results of the channel measurement parameters and the location measurement parameters of the current serving cell and the at least one first adjacent cell;

where the processing module 114 is further configured to perform handover from the current serving cell to the target cell.

In a possible implementation, the conditional handover command includes at least one of the following handover conditions for the terminal device to perform handover from the current serving cell to each of the at least one first adjacent cell: a handover condition based on channel measurement parameters, a handover condition based on channel measurement parameters, or handover condition based on channel measurement parameters and location measurement parameters.

In a possible implementation, the processing module 114 is specifically configured to:

determine at least one second adjacent cell which satisfies the handover condition according to the measurement results of the channel measurement parameters and the location measurement parameters of the current serving cell and the at least one first adjacent cell; and determine the target cell from the at least one second adjacent cell.

In a possible implementation, the processing module 114 is specifically configured to:

if there exists in the at least one first adjacent cell at least one third adjacent cell which satisfies a first handover condition, determine whether the at least one third adjacent cell satisfies a second handover condition;

if there exists in the at least one third adjacent cell at least one fourth adjacent cell which satisfies the second handover condition, determine the second adjacent cell from the at least one fourth adjacent cell;

where the first handover condition is a handover condition based on channel measurement parameters, and correspondingly, the second handover condition is a handover condition based on location measurement parameters; or, the first handover condition is a handover condition based on location measurement parameters, and correspondingly, the second handover condition is a handover condition based on channel measurement parameters.

In a possible implementation, the processing module 114 is specifically configured to:

take the at least one fourth adjacent cell as the at least one second adjacent cell.

In a possible implementation, the processing module 114 is specifically configured to:

determine whether the at least one fourth adjacent cell satisfies the first handover condition; and take the fourth adjacent cell as the second adjacent cell if the fourth adjacent cell satisfies the first handover condition.

In a possible implementation, the processing module 114 is specifically configured to:

determine whether the at least one fourth adjacent cell satisfies a leaving condition corresponding to the first handover condition; and take the fourth adjacent cell as the second adjacent cell if the fourth adjacent cell does not satisfy the leaving condition corresponding to the first handover condition.

In a possible implementation, the handover condition based on channel measurement parameters is: within a ninth preset time period, a measurement value of the channel measurement parameter of the first adjacent cell is greater than or equal to a third channel measurement threshold, and a measurement value of the channel measurement parameter of the current serving cell is less than or equal to a fourth channel measurement threshold; or, the handover condition based on channel measurement parameters is: within a tenth preset time period, a difference between a measurement value of the channel measurement parameter of the first adjacent cell and a measurement value of the channel measurement parameter of the current serving cell is greater than or equal to a third relative threshold.

In a possible implementation, the handover condition based on location measurement parameters is: within an eleventh preset time period, a measurement value of the location measurement parameter of the first adjacent cell is less than or equal to a third location measurement threshold, and a measurement value of the location measurement parameter of the current serving cell is greater than or equal to a fourth location measurement threshold; or, the handover condition based on location measurement parameters is: within a twelfth preset time period, a difference between a measurement value of the location measurement parameter of the current serving cell and a measurement value of the location measurement parameter of the first adjacent cell is greater than or equal to a fourth relative threshold.

In a possible implementation, if a first handover condition is the handover condition based on channel measurement parameters, a leaving condition corresponding to the first handover condition is:

within the ninth preset time period, the measurement value of the channel measurement parameter of the first adjacent cell is less than a fifth channel measurement threshold, and/or the measurement value of the channel measurement parameter of the current serving cell is greater than a sixth channel measurement threshold; or, within the tenth preset time period, the difference between the measurement value of the channel measurement parameter of the first adjacent cell and the measurement value of the channel measurement parameter of the current serving cell is less than a fifth relative threshold.

In a possible implementation, if a first handover condition is the handover condition based on location measurement parameters, a leaving condition corresponding to the first handover condition is:

within the eleventh preset time period, the measurement value of the location measurement parameter of the first adjacent cell is greater than a seventh location measurement threshold, and/or the measurement value of the location measurement parameter of the current serving cell is smaller than an eighth location measurement value threshold; or, within the twelfth preset time period, the difference between the measurement value of the location measurement parameter of the current serving cell and the measurement value of the location measurement parameter of the first adjacent cell is less than a sixth relative threshold.

In a possible implementation, the processing module 114 is specifically configured to:

if there exists in the at least one first adjacent cell at least one fifth adjacent cell which satisfies the handover condition based on channel measurement parameters and location measurement parameters, take the at least one fifth adjacent cell as the at least one second adjacent cell.

In a possible implementation, the handover condition based on channel measurement parameters and location measurement parameters is: within a thirteenth preset time period, a measurement value of the channel measurement parameter of the first adjacent cell is greater than or equal to a third channel measurement threshold, and a measurement value of the channel measurement parameter of the current serving cell is less than or equal to a fourth channel measurement threshold, a measurement value of the location measurement parameter of the first adjacent cell is less than or equal to a third location measurement threshold, and a measurement value of the location measurement parameter of the current serving cell is greater than or equal to a fourth location measurement threshold; or, the handover condition based on channel measurement parameters and location measurement parameters is: within a fourteenth preset time period, a difference between a measurement value of the channel measurement parameter of the first adjacent cell and a measurement value of the channel measurement parameter of the current serving cell is greater than or equal to a third relative threshold, and a difference between a measurement value of the location measurement parameter of the current serving cell and a measurement value of the location measurement parameter of the first adjacent cell is greater than or equal to a fourth relative threshold; or the handover condition based on channel measurement parameters and location measurement parameters is: within a fifteenth preset time period, a measurement value of the channel measurement parameter of the first adjacent cell is greater than or equal to a third channel measurement threshold, and a measurement value of the channel measurement parameter of the current serving cell is less than or equal to a fourth channel measurement threshold, and a difference between a measurement value of the location measurement parameter of the current serving cell and a measurement value of the location measurement parameter of the first adjacent cell is greater than or equal to a fourth relative threshold; or, the handover condition based on channel measurement parameters and location measurement parameters is: within a sixteenth preset time period, a difference between a measurement value of the channel measurement parameter of the first adjacent cell and a measurement value of the channel measurement parameter of the current serving cell is greater than or equal to a third relative threshold, a measurement value of the location measurement parameter of the first adjacent cell is less than or equal to a third location measurement threshold, and a measurement value of the location measurement parameter of the current serving cell is greater than or equal to a fourth location measurement threshold.

In a possible implementation, the channel measurement parameter includes at least one of the following: a reference signal received power RSRP or a reference signal received quality RSRQ.

In a possible implementation, the location measurement parameter includes at least one of the following: a round-trip transmission time RTT between the terminal device and the network device, or a distance between the terminal device and a ground reference point.

The terminal device provided by any of the above implementations is used to execute technical solutions of the terminal device side in any of the foregoing method embodiments, and the implementation principles and technical effects thereof are similar, which will not be repeated here.

Figure 13:
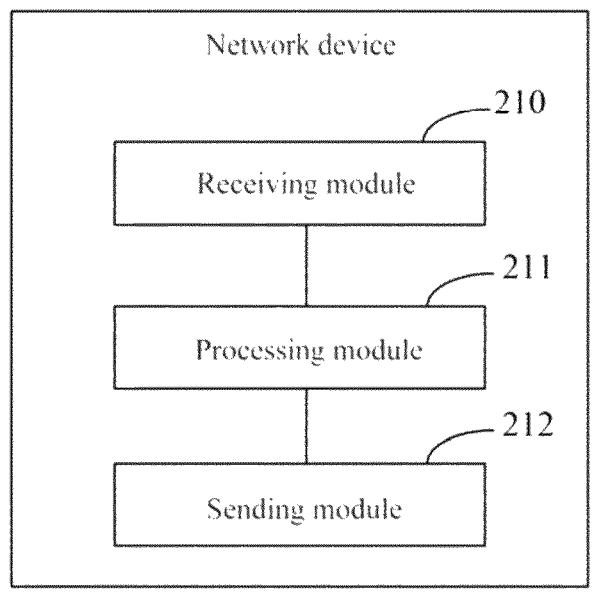
FIG. 13 is a schematic structural diagram of Embodiment I of a network device provided by the present application.

FIG. 13 is a schematic structural diagram of Embodiment I of a network device provided by the present application. As shown in FIG. 13, the network device includes:

a receiving module 210, configured to receive measurement results of a current serving cell and at least one second adjacent cell, where the at least one second adjacent cell is an adjacent cell which satisfies a first measurement reporting condition in the at least one first adjacent cell;

a processing module 211, configured to determine a target cell according to the measurement results of the current serving cell and the at least one second adjacent cell; and a sending module 212, configured to send a handover command, where the handover command is configured to instruct a terminal device to perform handover from the current serving cell to the target cell.

In a possible implementation, the sending module 212 is further configured to: send a first measurement reporting condition corresponding to a measurement result of each of the at least one first adjacent cell, where the first measurement reporting condition includes at least one of the following: a second measurement reporting condition based on channel measurement parameters, a third measurement reporting condition based on location measurement parameters, or a fourth measurement reporting condition based on channel measurement parameters and location measurement parameters.

In a possible implementation, the second measurement reporting condition is: within a first preset time period, a measurement value of the channel measurement parameter of the first adjacent cell is greater than or equal to a first channel measurement threshold, and a measurement value of the channel measurement parameter of the current serving cell is less than or equal to a second channel measurement threshold; or, the second measurement reporting condition is: within a second preset time period, a difference between a measurement value of the channel measurement parameter of the first adjacent cell and a measurement value of the channel measurement parameter of the current serving cell is greater than or equal to a first relative threshold.

In a possible implementation, the third measurement reporting condition is: within a third preset time period, a measurement value of the location measurement parameter of the first adjacent cell is less than or equal to a first location measurement threshold, and a measurement value of the location measurement parameter of the current serving cell is greater than or equal to a second location measurement threshold; or, the third measurement reporting condition is: within a fourth preset time period, a difference between a measurement value of the location measurement parameter of the current serving cell and a measurement value of the location measurement parameter of the first adjacent cell is greater than or equal to a second relative threshold.

In a possible implementation, the fourth measurement reporting condition is: within a fifth preset time period, a measurement value of the location measurement parameter of the first adjacent cell is less than or equal to a first location measurement threshold, and a measurement value of the location measurement parameter of the current serving cell is greater than or equal to a second location measurement threshold, a measurement value of the channel measurement parameter of the first adjacent cell is greater than or equal to a first channel measurement threshold, and a measurement value of the channel measurement parameter of the current serving cell is less than or equal to a second channel measurement threshold; or, the fourth measurement reporting condition is: within a sixth preset time period, a difference between a measurement value of the channel measurement parameter of the first adjacent cell and a measurement value of the channel measurement parameter of the current serving cell is greater than or equal to a first relative threshold, and a difference between a measurement value of the location measurement parameter of the current serving cell and a measurement value of the location measurement parameter of the first adjacent cell is greater than or equal to a second relative threshold; or the fourth measurement reporting condition is: within a seventh preset time period, a measurement value of the location measurement parameter of the first adjacent cell is less than or equal to a first location measurement threshold, and a measurement value of the location measurement parameter of the current serving cell is greater than or equal to a second location measurement threshold, and a difference between a measurement value of the channel measurement parameter of the first adjacent cell and a measurement value of the channel measurement parameter of the current serving cell is greater than or equal to a first relative threshold; or, the fourth measurement reporting condition is: within an eighth preset time period, a measurement value of the channel measurement parameter of the first adjacent cell is greater than or equal to a first channel measurement threshold, and a measurement value of the channel measurement parameter of the current serving cell is less than or equal to a second channel measurement threshold, and a difference between a measurement value of the location measurement parameter of the current serving cell and a measurement value of the location measurement parameter of the first adjacent cell is greater than or equal to a second relative threshold.

In a possible implementation, if the measurement results of the current serving cell and the at least one second adjacent cell respectively include a measurement result based on a channel measurement parameter and a location measurement parameter, the processing module 211 is specifically configured to:

if there is one second adjacent cell, take the second adjacent cell as the target cell;

if there are multiple second adjacent cells, select one of the second adjacent cell as the target cell.

In a possible implementation, where if the measurement result of the current serving cell includes a measurement result based on a channel measurement parameter and a location measurement parameter, the measurement result of the at least one second adjacent cell includes a measurement result based on a channel measurement parameter of at least one third adjacent cell and a measurement result based on a location measurement parameter of at least one fourth adjacent cell, where the second adjacent cell includes the third adjacent cell and the fourth adjacent cell, the processing module 212 is specifically configured to:

if there exists at least one same adjacent cell in the third adjacent cell and the fourth adjacent cell, and there is one same adjacent cell, take the same adjacent cell as the target cell;

if there exists at least one same adjacent cell in the third adjacent cell and the fourth adjacent cell, and there are multiple same adjacent cells, select one of the same adjacent cells as the target cell.

In a possible implementation, the channel measurement parameter includes at least one of the following: a reference signal received power RSRP or a reference signal received quality RSRQ.

In a possible implementation, the location measurement parameter includes at least one of the following: a round-trip transmission time RTT between the terminal device and the network device, or a distance between the terminal device and a ground reference point.

The network device provided by any of the above implementations is used to execute technical solutions of the network device side in any of the foregoing method embodiments, and the implementation principles and technical effects thereof are similar, which will not be repeated here.

Figure 14:
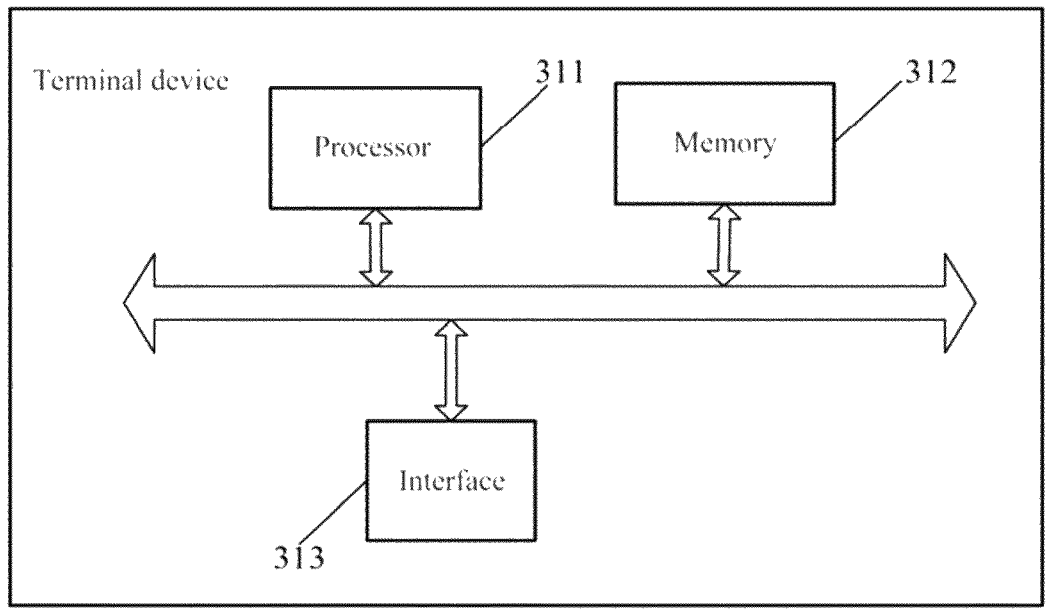
FIG. 14 is a schematic structural diagram of Embodiment III of a terminal device provided by the present application.

FIG. 14 is a schematic structural diagram of Embodiment III of a terminal device provided by the present application. As shown in FIG. 14, the terminal device includes:

a processor 311, a memory 312, and an interface 313 for communicating with a network device; where the memory 312 stores computer-executable instructions;

the processor 311 executes the computer-executed instructions stored in the memory 312, to cause the processor 311 to execute the technical solution on the terminal device side in any of the foregoing method embodiments.

FIG. 14 is a simple design of a terminal device. The embodiments of the present application do not limit the number of processors and memories in the terminal device. FIG. 14 only takes the number of one as an example for illustration.

Figure 15:
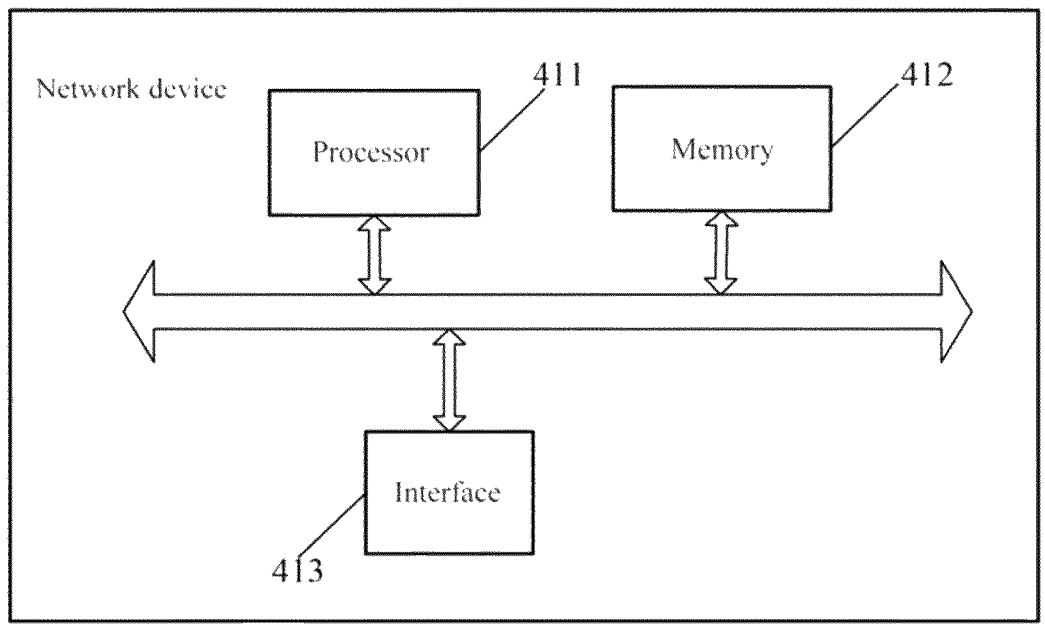
FIG. 15 is a schematic structural diagram of Embodiment II of a network device provided by the present application.

FIG. 15 is a schematic structural diagram of the Embodiment II of a network device provided by the present application. As shown in FIG. 15, the network device includes:

a processor 411, a memory 412, and an interface 413 for communicating with the terminal device;

the memory 412 stores computer-executable instructions;

the processor 411 executes the computer-executed instructions stored in the memory 412, to cause the processor 411 to execute the technical solution on the network device side in any of the foregoing method embodiments.

FIG. 15 is a simple design of a network device. The embodiments of the present application do not limit the number of processors and memories in the network device. FIG. 15 only takes the number of one as an example for illustration.

In a specific implementation of the terminal device shown in FIG. 14 and the network device shown in FIG. 15, the memory, the processor and the interface may be connected through a bus, and in an implementation, the memory may be integrated inside the processor.

An embodiment of the present application further provides a computer-readable storage medium, where the computer-readable storage medium stores computer-executable instructions, and the computer-executable instructions are used to implement the technical solution of the terminal device in any of the foregoing method embodiments when being executed by a processor.

An embodiment of the present application further provides a computer-readable storage medium, where the computer-readable storage medium stores the computer-executable instructions, and the computer-executable instructions are used to implement the technical solution of the network device in any of the foregoing method embodiments when being executed by a processor.

An embodiment of the present application further provides a program, where the program is configured to execute the technical solution of the terminal device in any of the foregoing method embodiments when being executed by a processor.

An embodiment of the present application further provide a program, where the program is configured to execute the technical solution of the network device in any of the foregoing method embodiments when being executed by a processor.

In an implementation, the above-mentioned processor may be a chip.

An embodiment of the present application further provides a computer program product including program instructions, where the program instructions are configured to implement the technical solution of the terminal device in any of the foregoing method embodiments.

An embodiment of the present application further provides a computer program product including program instructions, where the program instructions are configured to implement the technical solution of the network device in any of the foregoing method embodiments.

An embodiment of the present application further provides a chip, which includes a processing module and a communication interface, where the processing module can execute the technical solutions on the terminal device side in any of the foregoing method embodiments.

Furthermore, the chip further includes a storage module (such as a memory), the storage module is configured to store instructions, the processing module is configured to execute the instructions stored in the storage module, and the execution of the instructions stored in the storage module causes the processing module to execute the technical solutions on the terminal device side in any of the foregoing method embodiments.

An embodiment of the present application further provides a chip, which includes a processing module and a communication interface, where the processing module can execute the technical solutions on the network device side in any of the foregoing method embodiments.

Furthermore, the chip further includes a storage module (such as a memory), the storage module is configured to store instructions, the processing module is configured to execute the instructions stored in the storage module, and the execution of the instructions stored in the storage module causes the processing module to execute the technical solutions on the network device side in any of the foregoing method embodiments.

In the several embodiments provided in the present application, it should be understood that the disclosed devices and methods may be implemented in other ways. For example, the device embodiments described above are only illustrative. For example, the division of the modules is only a logical function division, and there may be other divisions in actual implementation, for example, multiple modules may be combined or integrated to another system, or some features may be ignored, or not implemented. In addition, the displayed or discussed mutual coupling or direct coupling or communication connection may be indirect coupling or communication connection through some interfaces or modules, and may be in electrical, mechanical or other forms.

In the specific implementation of the aforementioned terminal device and network device, it should be understood that the processor may be a central processing unit (CPU), or other general-purpose processors, a digital signal processor (DSP), an application specific integrated circuit (ASIC), etc. The general-purpose processor may be a microprocessor or the processor may also be any conventional processor or the like. The steps of the method disclosed in the present application may be directly embodied as being executed and completed by a hardware processor, or executed and completed by a combination of hardware and software modules in the processor.

All or a part of the steps in the aforementioned method embodiments may be implemented by a program instructing relevant hardware. The aforementioned program may be stored in a readable memory. When the program is executed, the steps including the aforementioned method embodiments are executed; and the foregoing memory (storage medium) includes: a read-only memory (ROM), an RAM, a flash memory, a hard disk, a solid-state drive, a magnetic tape, a floppy disk, an optical disc and any combination thereof.

What is claimed is:

1. A non terrestrial communication network (NTN) handover method, comprising:
    measuring, by a terminal device, channel measurement parameters and location measurement parameters of a current serving cell and at least one first adjacent cell according to a conditional handover command received; wherein the conditional handover command is configured to trigger the terminal device to measure based on the channel measurement parameters and the location measurement parameters, and the conditional handover command comprises at least one of the following handover conditions for the terminal device to perform handover from the current serving cell to each of the at least one first adjacent cell: a handover condition based on channel measurement parameters, or a handover condition based on location measurement parameters;
    determining, by the terminal device, a target cell which satisfies a handover condition according to measurement results of the channel measurement parameters and the location measurement parameters of the current serving cell and the at least one first adjacent cell; and
    performing, by the terminal device, handover from the current serving cell to the target cell;
    wherein the channel measurement parameter comprises at least one of the following: a reference signal received power (RSRP) or a reference signal received quality (RSRQ); and
    the location measurement parameter comprises at least one of the following: a round-trip transmission time (RTT) between the terminal device and the network device, or a distance between the terminal device and a ground reference point;
    wherein the determining, by the terminal device, the target cell which satisfies the handover condition according to the measurement results of the channel measurement parameters and the location measurement parameters of the current serving cell and the at least one first adjacent cell, comprises;
    determining, by the terminal device, at least one second adjacent cell which satisfies the handover condition according to the measurement results of the channel measurement parameters and the location measurement parameters of the current serving cell and the at least one first adjacent cell; and
    determining, by the terminal device, the target cell from the at least one second adjacent cell;
        wherein the determining, by the terminal device, the at least one second adjacent cell which satisfies the handover condition according to the measurement results of the channel measurement parameters and the location measurement parameters of the current serving cell and the at least one first adjacent cell, comprises:
        if there exists in the at least one first adjacent cell at least one third adjacent cell which satisfies a first handover condition, determining, by the terminal device, whether the at least one third adjacent cell satisfies a second handover condition;
        if there exists in the at least one third adjacent cell at least one fourth adjacent cell which satisfies the second handover condition, determining, by the terminal device, the second adjacent cell from the at least one fourth adjacent cell;
        wherein the first handover condition is the handover condition based on channel measurement parameters, and correspondingly, the second handover condition is the handover condition based on location measurement parameters; or,
        the first handover condition is the handover condition based on location measurement parameters, and correspondingly, the second handover condition is the handover condition based on channel measurement parameters.

2. The method according to claim 1, wherein the handover condition based on channel measurement parameters is: within a ninth preset time period, a measurement value of the channel measurement parameter of the first adjacent cell is greater than or equal to a third channel measurement threshold, and a measurement value of the channel measurement parameter of the current serving cell is less than or equal to a fourth channel measurement threshold.

3. The method according to claim 2, wherein if the first handover condition is the handover condition based on channel measurement parameters, a leaving condition corresponding to the first handover condition is:
within the ninth preset time period, the measurement value of the channel measurement parameter of the first adjacent cell is less than a fifth channel measurement threshold, and/or the measurement value of the channel measurement parameter of the current serving cell is greater than a sixth channel measurement threshold.

4. The method according to claim 2, wherein if the first handover condition is the handover condition based on channel measurement parameters, a leaving condition corresponding to the first handover condition is:
within the tenth preset time period, the difference between the measurement value of the channel measurement parameter of the first adjacent cell and the measurement value of the channel measurement parameter of the current serving cell is less than a fifth relative threshold.

5. The method according to claim 1, wherein the handover condition based on location measurement parameters is: within a eleventh preset time period, a measurement value of the location measurement parameter of the first adjacent cell is less than or equal to a third location measurement threshold, and a measurement value of the location measurement parameter of the current serving cell is greater than or equal to a fourth location measurement threshold.

6. The method according to claim 5, wherein if the first handover condition is a handover condition based on location measurement parameters, a leaving condition corresponding to the first handover condition is:
within the eleventh preset time period, the measurement value of the location measurement parameter of the first adjacent cell is greater than a seventh location measurement threshold, and/or the measurement value of the location measurement parameter of the current serving cell is smaller than an eighth location measurement value threshold.

7. The method according to claim 5, wherein if the first handover condition is a handover condition based on location measurement parameters, a leaving condition corresponding to the first handover condition is:
within the twelfth preset time period, the difference between the measurement value of the location measurement parameter of the current serving cell and the measurement value of the location measurement parameter of the first adjacent cell is less than a sixth relative threshold.

8. A non-transitory computer-readable storage medium, wherein the computer-readable storage medium stores computer-executable instructions, and the computer-executable instructions, when executed by a processor, are used to implement the handover method according to claim 1.

9. The method according to claim 1, wherein the determining, by the terminal device, the second adjacent cell from the at least one fourth adjacent cell, comprises:
taking, by the terminal device, the at least one fourth adjacent cell as the at least one second adjacent cell.

10. A terminal device, comprising:
a processor, a memory, and an interface for communicating with a network device; wherein
the memory stores computer-executable instructions; and
the processor executes the computer-executable instructions stored in the memory to cause the processor to:
measure channel measurement parameters and location measurement parameters of a current serving cell and at least one first adjacent cell according to a conditional handover command received; wherein the conditional handover command is configured to trigger the terminal device to measure based on the channel measurement parameters and the location measurement parameters, and the conditional handover command comprises at least one of the following handover conditions for the terminal device to perform handover from the current serving cell to each of the at least one first adjacent cell: a handover condition based on channel measurement parameters, or a handover condition based on location measurement parameters;
determine a target cell which satisfies a handover condition according to measurement results of the channel measurement parameters and the location measurement parameters of the current serving cell and the at least one first adjacent cell; and
perform handover from the current serving cell to the target cell;
wherein the channel measurement parameter comprises at least one of the following: a reference signal received power (RSRP) or a reference signal received quality (RSRQ); and
the location measurement parameter comprises at least one of the following: a round-trip transmission time (RTT) between the terminal device and the network device, or a distance between the terminal device and a ground reference point;
wherein the processor is further caused to:
determine at least one second adjacent cell which satisfies the handover condition according to the measurement results of the channel measurement parameters and the location measurement parameters of the current serving cell and the at least one first adjacent cell; and
determine the target cell from the at least one second adjacent cell;
wherein the processor is further caused to:
if there exists in the at least one first adjacent cell at least one third adjacent cell which satisfies a first handover condition, determine whether the at least one third adjacent cell satisfies a second handover condition;
if there exists in the at least one third adjacent cell at least one fourth adjacent cell which satisfies the second handover condition, determine the second adjacent cell from the at least one fourth adjacent cell;
wherein the first handover condition is the handover condition based on channel measurement parameters, and correspondingly, the second handover condition is the handover condition based on location measurement parameters; or,
the first handover condition is the handover condition based on location measurement parameters, and correspondingly, the second handover condition is the handover condition based on channel measurement parameters.

11. A non terrestrial communication network (NTN) handover method, comprising:
sending, by a network device, a conditional handover command, wherein the conditional handover command is configured to trigger the terminal device to measure channel measurement parameters and location measurement parameters of a current serving cell and at least one first adjacent cell, and the conditional handover command comprises at least one of the following handover conditions for the terminal device to perform handover from the current serving cell to each of the at least one first adjacent cell;
a handover condition based on channel measurement parameters, or a handover condition based on location measurement parameters, so that the terminal device determines a target cell which satisfies a handover condition according to measurement results of the channel measurement parameters and the location measurement parameters of the current serving cell and the at least one first adjacent cell;
wherein the channel measurement parameter comprises at least one of the following: a reference signal received power (RSRP) or a reference signal received quality (RSRQ); and
the location measurement parameter comprises at least one of the following: a round-trip transmission time (RTT) between the terminal device and the network device, or a distance between the terminal device and a ground reference point;
wherein the terminal device determining the target cell which satisfies the handover condition according to the measurement results of the channel measurement parameters and the location measurement parameters of the current serving cell and the at least one first adjacent cell comprises:
the terminal device determining at least one second adjacent cell which satisfies the handover condition according to the measurement results of the channel measurement parameters and the location measurement parameters of the current serving cell and the at least one first adjacent cell; and
the terminal device determining the target cell from the at least one second adjacent cell;
wherein the terminal device determining the at least one second adjacent cell which satisfies the handover condition according to the measurement results of the channel measurement parameters and the location measurement parameters of the current serving cell and the at least one first adjacent cell, comprises:
if there exists in the at least one first adjacent cell at least one third adjacent cell which satisfies a first handover condition, the terminal device determining whether the at least one third adjacent cell satisfies a second handover condition;
if there exists in the at least one third adjacent cell at least one fourth adjacent cell which satisfies the second handover condition, the terminal device determining the second adjacent cell from the at least one fourth adjacent cell;
wherein the first handover condition is the handover condition based on channel measurement parameters, and correspondingly, the second handover condition is the handover condition based on location measurement parameters; or,
the first handover condition is the handover condition based on location measurement parameters, and correspondingly, the second handover condition is the handover condition based on channel measurement parameters.

12. A network device, comprising:
a processor, a memory, and an interface for communicating with a terminal device; wherein
the memory stores computer-executable instructions; and
the processor executes the computer-executable instructions stored in the memory to cause the processor to execute the handover method according to claim 11.

13. A non-transitory computer-readable storage medium, wherein the computer-readable storage medium stores computer-executable instructions, and the computer-executable instructions, when executed by a processor, are used to implement the data handover according to claim 11.

14. The method according to claim 11, wherein
the handover condition based on channel measurement parameters is: within a tenth preset time period, a difference between a measurement value of the channel measurement parameter of the first adjacent cell and a measurement value of the channel measurement parameter of the current serving cell is greater than or equal to a third relative threshold.

15. The method according to claim 11, wherein
the handover condition based on location measurement parameters is: within a twelfth preset time period, a difference between a measurement value of the location measurement parameter of the current serving cell and a measurement value of the location measurement parameter of the first adjacent cell is greater than or equal to a fourth relative threshold.

* * * * *